(12) United States Patent
Srivastava et al.

(10) Patent No.: US 7,757,226 B2
(45) Date of Patent: Jul. 13, 2010

(54) METHOD AND MECHANISM FOR PERFORMING A ROLLING UPGRADE OF DISTRIBUTED COMPUTER SOFTWARE

(75) Inventors: Alok Kumar Srivastava, Newark, CA (US); Rajiv Jayaraman, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 918 days.

(21) Appl. No.: 10/803,623

(22) Filed: Mar. 17, 2004

(65) Prior Publication Data

US 2005/0210461 A1    Sep. 22, 2005

(51) Int. Cl.
*G06F 9/44* (2006.01)
(52) U.S. Cl. .................. 717/170; 717/169; 717/175
(58) Field of Classification Search .......... 717/168–178
See application file for complete search history.

(56) References Cited

U.S. PATENT DOCUMENTS

| | | | |
|---|---|---|---|
| 5,140,685 A | 8/1992 | Sipple et al. | |
| 5,260,697 A | 11/1993 | Barrett et al. | |
| 5,398,183 A | 3/1995 | Elliott | |
| 5,408,653 A | 4/1995 | Josten et al. | |
| 5,481,712 A | 1/1996 | Silver et al. | |
| 5,504,917 A | 4/1996 | Austin | |
| 5,577,240 A | 11/1996 | Demers et al. | |
| 5,634,134 A | 5/1997 | Kumai et al. | |
| 5,706,510 A * | 1/1998 | Burgoon | 707/203 |
| 5,737,601 A | 4/1998 | Jain et al. | |
| 5,761,660 A | 6/1998 | Josten et al. | |
| 5,765,159 A | 6/1998 | Srinivasan | |
| 5,781,912 A | 7/1998 | Demers et al. | |
| 5,794,229 A | 8/1998 | French et al. | |
| 5,806,076 A | 9/1998 | Ngai et al. | |
| 5,870,760 A | 2/1999 | Demers et al. | |
| 5,870,761 A | 2/1999 | Demers et al. | |
| 5,940,826 A | 8/1999 | Heideman et al. | |
| 5,991,765 A | 11/1999 | Vethe | |
| 6,122,640 A | 9/2000 | Pereira | |
| 6,178,546 B1 * | 1/2001 | McIntyre | 717/115 |
| 6,195,650 B1 * | 2/2001 | Gaither et al. | 707/1 |
| 6,349,310 B1 | 2/2002 | Klein et al. | |
| 6,356,889 B1 | 3/2002 | Lohman et al. | |
| 6,397,227 B1 | 5/2002 | Klein et al. | |
| 6,411,956 B1 | 6/2002 | Ng | |
| 6,434,545 B1 | 8/2002 | MacLeod et al. | |
| 6,434,568 B1 | 8/2002 | Bowman-Amuah | |

(Continued)

OTHER PUBLICATIONS

Thekkath et al. "Fkangipani: A Scalable Distributed File System", 1997, ACM, pp. 224-237.*

(Continued)

*Primary Examiner*—Wei Y Zhen
*Assistant Examiner*—Phillip H Nguyen
(74) *Attorney, Agent, or Firm*—Vista IP Law Group, LLP.

(57) ABSTRACT

An improved method and mechanism for performing rolling upgrades to distributed software installations is disclosed. The present approach eliminates or minimizes extraneous downtime when performing a rolling upgrade, thereby improving performance an availability for users of the software installation. A rolling upgrade can be performed by defining a private symbolic link for each member that is upgraded to reference the upgraded version of the software installation.

43 Claims, 22 Drawing Sheets

U.S. PATENT DOCUMENTS

| | | | |
|---|---|---|---|
| 6,442,748 B1 | 8/2002 | Bowman-Amuah | |
| 6,460,027 B1 | 10/2002 | Cochrane et al. | |
| 6,493,701 B2 | 12/2002 | Ponnekanti | |
| 6,496,850 B1 | 12/2002 | Bowman-Amuah | |
| 6,560,606 B1 | 5/2003 | Young | |
| 6,615,223 B1 | 9/2003 | Shih et al. | |
| 6,701,345 B1 | 3/2004 | Carley et al. | |
| 6,714,943 B1 | 3/2004 | Ganesh et al. | |
| 6,725,453 B1 * | 4/2004 | Lucas et al. | 717/178 |
| 6,728,719 B1 | 4/2004 | Ganesh et al. | |
| 6,741,997 B1 | 5/2004 | Liu et al. | |
| 6,744,449 B2 | 6/2004 | MacLeod et al. | |
| 6,804,672 B1 | 10/2004 | Klein et al. | |
| 6,856,989 B1 * | 2/2005 | Zhou et al. | 707/9 |
| 6,910,109 B2 | 6/2005 | Holman et al. | |
| 6,950,833 B2 * | 9/2005 | Costello et al. | 707/201 |
| 6,961,931 B2 | 11/2005 | Fischer | |
| 6,966,058 B2 * | 11/2005 | Earl et al. | 717/171 |
| 6,996,588 B2 * | 2/2006 | Azagury et al. | 707/204 |
| 7,080,062 B1 | 7/2006 | Leung et al. | |
| 7,130,897 B2 * | 10/2006 | Dervin et al. | 709/221 |
| 7,139,749 B2 | 11/2006 | Bossman et al. | |
| 7,162,477 B1 | 1/2007 | Mukherjee | |
| 7,505,971 B2 * | 3/2009 | Sander et al. | 707/9 |
| 2002/0198867 A1 | 12/2002 | Lohman et al. | |
| 2003/0093408 A1 | 5/2003 | Brown et al. | |
| 2003/0130985 A1 | 7/2003 | Driesen et al. | |
| 2003/0135478 A1 | 7/2003 | Marshall et al. | |
| 2003/0177137 A1 | 9/2003 | MacLeod et al. | |
| 2003/0182276 A1 | 9/2003 | Bossman et al. | |
| 2003/0229639 A1 | 12/2003 | Carlson et al. | |
| 2004/0002990 A1 * | 1/2004 | Sander et al. | 707/102 |
| 2004/0003004 A1 | 1/2004 | Chaudhuri et al. | |
| 2004/0019587 A1 | 1/2004 | Fuh et al. | |
| 2005/0097091 A1 | 5/2005 | Ramacher et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yagoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0160419 A1 * | 7/2005 | Alam et al. | 717/174 |
| 2005/0177557 A1 | 8/2005 | Ziauddin et al. | |
| 2005/0187917 A1 | 8/2005 | Lawande et al. | |
| 2005/0210461 A1 | 9/2005 | Srivastava et al. | |
| 2005/0251523 A1 | 11/2005 | Rajamani et al. | |
| 2006/0004828 A1 | 1/2006 | Rajamani et al. | |

OTHER PUBLICATIONS

Yeager "A Distributed File System for Distributed Conferencing System", 2003, pp. 1-109.*
Ajmani, S. et al. "Scheduling and Simulation: How to Upgrade Distributed Systems" Proceedings of the HotOS IX: The 9th Workshop on Hot Topics in Operating Systems, Lihue, HI, May 18-21, 2003, 6 pgs.
Compaq "OpenVMS VAX Version 7.3" Upgrade and Installation Manual, Sep. 2001, Compaq Computer Corporation, Houston, TX.
Compaq "Digital Unix TruCluster Software Version 1.5 Technical Resources Kit" Sep. 1998, Title Page, Table of Contents, 24 pgs., Compaq Computer Corporation, Houston, TX.
Compaq White Paper "ASU—Becoming a Multi-instance Application in a TruCluster Server Environment", Oct. 2000, 6 pgs., UNIX Software Division, Compaq Computer Corporation, Houston, TX.
Compaq "TruCluster Products for Digital Unix" 1997, 6 pgs., Compaq Computer Corporation, Houston, TX.
Cook, J.E. et al. "Highly Reliable Upgrading of Components" Proceedings of the 21st International Conference on Software Engineering (ICSE '99), Los Angeles, CA, May 16-22, 1999, pp. 203-212.
Hicks, M. et al. "Dynamic Software Updating" Proceedings of the ACM SIGPLAN 2001 Conference on Programming Language Design and Implementation (PLDI 2001), Snowbird, UT, Jun. 20-22, 2001, pp. 13-23.
Oracle "Oracle Fail Safe" Installation Guide, Jan. 2001, Oracle Corporation, Redwood Shores, CA.
Osel, P.W. "OpenDist—Incremental Software Distribution" Proceedings of the 9th System Administration Conference (LISA '95), Monterey, CA, Sep. 18-25, 1995, pp. 181-193.
Ressman, D. et al. "Use of Cfengine for Automated Multi-Platform Software and Patch Distribution" Proceedings of the 14th Systems Administration Conference (LISA 2000), New Orleans, LA, Dec. 3-8, 2000, pp. 207-218.
Roush, E.T. "Cluster Rolling Upgrade Using Multiple Version Support" Proceedings of the 3rd IEEE International Conference on Cluster Computing (CLUSTER '01), Oct. 8-11, 2001, pp. 63-70.
Tai, A.T. et al. "On the Effectiveness of a Message-Driven Confidence-Driven Protocol for Guarded Software Upgrading" Proceedings of the 4th International Computer Performance and Dependability Symposium, Chicago, IL, Mar. 27-29, 2000, pp. 59-68.
Office Action dated Jun. 19, 2006 for U.S. Appl. No. 10/841,377.
Office Action dated Feb. 6, 2007 for U.S. Appl. No. 10/841,377.
Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.
Almeida, et al., "Panasync: Dependency tracking amond file copies", Proceedings of the 9th Workshop on ACM SIGOPS European Workshop: Beyond the PC: New Challenges for the Operating System, Kolding, Denmark, 2000, pp. 7-12.
Baldon, et al., "A Communication-Induced Checkpointing Protocol that Ensures Rollback-Dependency Trackability", 27the Annual International Symposium on Fault-Tolerant Computing, FTCS-27, IEEE, 1997, pp. 68-77.
Baldoni, et al., "Rollback-Dependency Trackability: Visible Characterizations", Proceedings of the 18th Annual ACM Symposium on Priciples of Distributed Computing, Atlanta, GA, 1999, pp. 33-42.
Damani, et al., "Optimistic Distributed Simulation Based on Transitive Dependency Tracking", Proceedings of the 11th Workshop on Parellel and Distributed Simulation, IEEE, 1997, pp. 90-97.
Elnozahy, "On the Relevance of Communication Costs of Rollbackk-Recovery Protocols", Proceedings of the 14th Annual ACM Symposium on Principles of Distributed Computing, Ottawa, Ontario, Canada, 1995, pp. 74-79.
Garcia, et al., "On the Minimal Characterization of the Rollback-Dependency Trackability Property", 21st International Conference on Distributed Computing Systems, IEEE, Apr. 16-19, 2001, pp. 342-349.
Graefe, G. "Dynamic Query Evaluation Plans: Some Course Corrections?", Bulletin of the IEE Computer Society Technical Committee on Data Engineering, Jun. 2000, vol. 23, No. 2, pp. 3-6.
Hellerstein, J.M. et al. "Adaptive Query Processing: Technology in Evolution", Bulletin of the IEE Computer Society Technical Committee on Data Engineering, Jun. 2000, vol. 23, No. 2, pp. 7-18.
Kabra, N. et al. "Efficient Mid-Query Re-Optimization of Sub-Optimal Query Execution Plans", Proceedings of the 1998 ACM SIGMOD International Conference on Management of Data, SIGMOD'98, Seattly, WA, 1998, pp. 106-117.
Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.
Perry, "Consumer Electronics", IEEE Spectrum, Jan., 1997, vol. 34, No. 1, pp. 43-48.
Sadri, Integrity Constraints in the Information Source Tracking Method, IEEE Transactions on Knowledge and Data, Feb. 1995, Vol. 7, Issue 1, pp. 106-119.
Sreenivas, et al., "Independent Global Snapshots in Large Distributed Systems", Proceedings of the 4th International Conference on High Performance Computing, IEEE, Dec. 18-21, 1997, pp. 462-467.

* cited by examiner

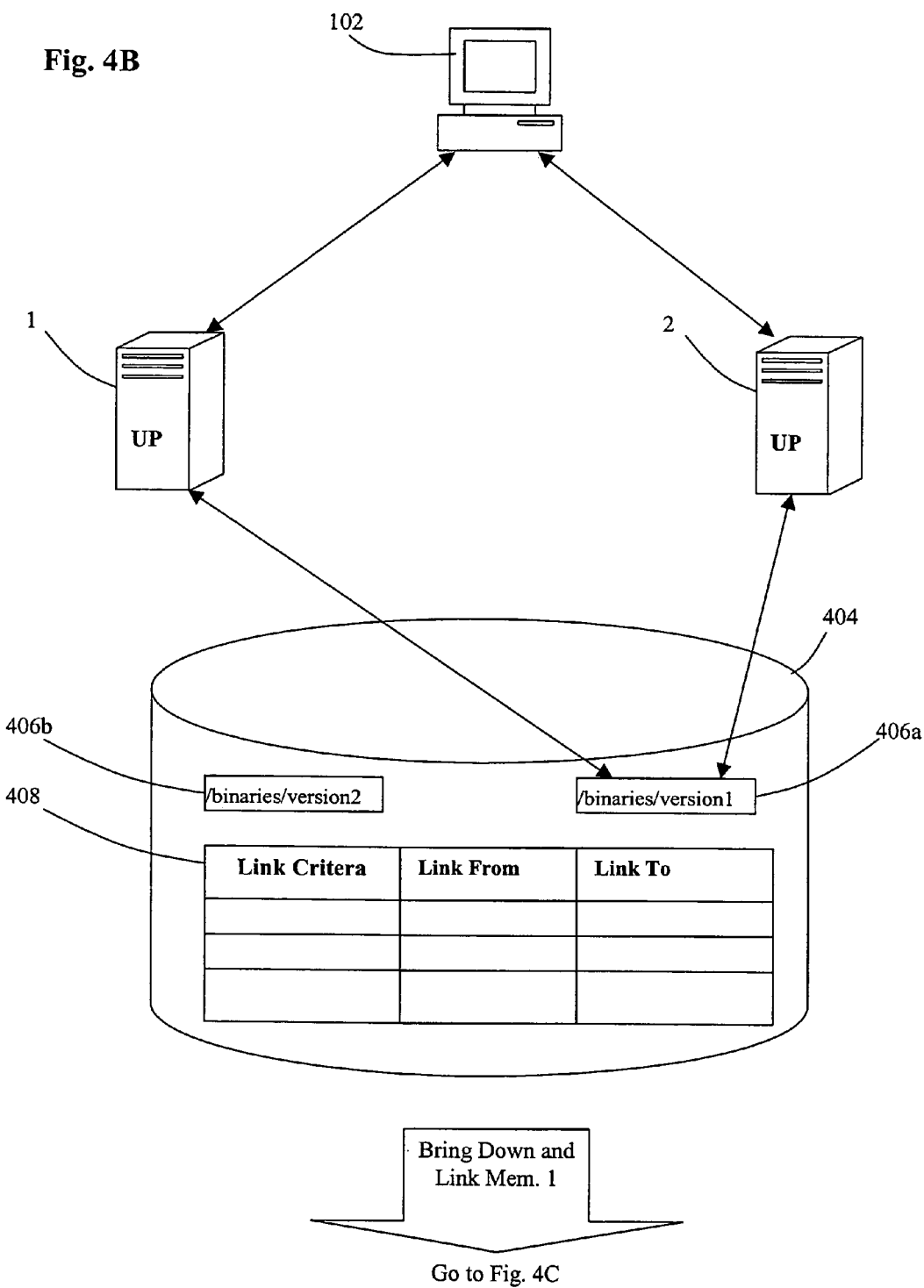

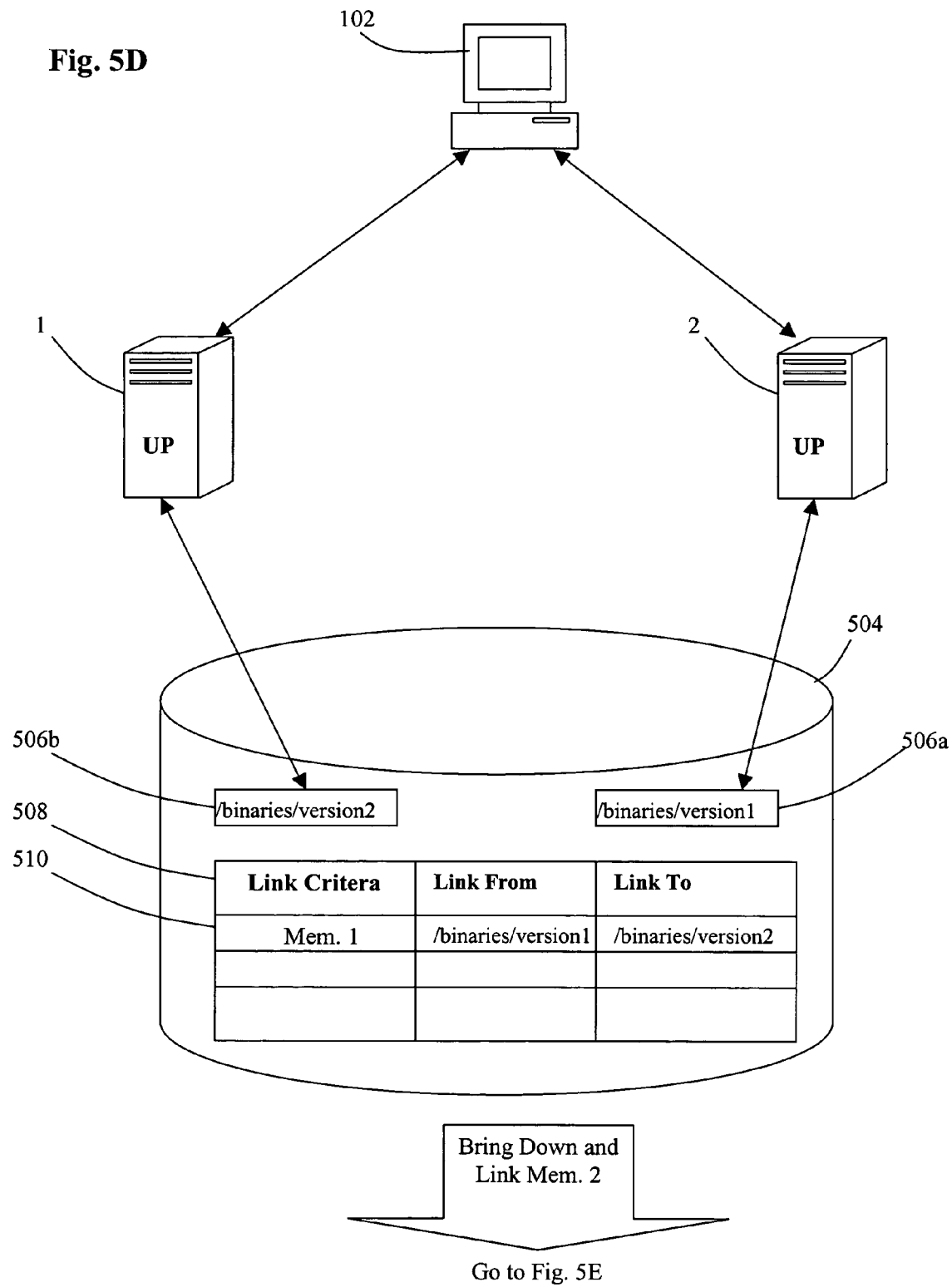

METHOD AND MECHANISM FOR PERFORMING A ROLLING UPGRADE OF DISTRIBUTED COMPUTER SOFTWARE

BACKGROUND AND SUMMARY

The invention relates to a method and mechanism for performing rolling software upgrades to a distributed computing system.

Over time, many types of software applications will undergo some sort of change. These changes may occur for a variety of reasons. For example, given the complexity of modern software applications, it is well known that most software contains coding errors or "bugs" that will need correction. One reason to upgrade from an earlier version to a later version of a software application is to correct errors or bugs that may exist in the earlier version. Another reason for changing a software application is to introduce improvements to the operation or functionality of the software application.

A "rolling upgrade" refers to the process of performing software upgrades to a live existing software installation in a distributed environment in which the individual instances, nodes, or entities of the distributed system (referred to herein as "members") are upgraded in a staggered manner. This form of upgrade ensures availability of the application during software upgrades, and thus minimizes or eliminates planned downtime while contributing to high availability goals. As used herein, the term member may encompass either a single instance/node/entity or a collection of such instances/nodes/entities.

At each member, there are numerous ways to upgrade a software application from an earlier version to a later version. A common approach is for a software developer to create patches and patch sets that are applied to a copy of the software binary or executable. Another common approach is to create a new object having the same location reference. Tools are often provided to perform the software upgrades or installations.

Performing an upgrade or change to an existing software application typically requires a shutdown of either/both the member or software enterprise. For example the upgrade can be performed by shutting down the software, implementing the upgrade, and then bringing the member back up so that availability is restored.

With modern software, it can be anticipated that software developers will provide upgrades and changes on an ongoing basis. In fact, many IT ("information technology") departments will periodically schedule planned events to perform upgrades to their software installations. These events could result in significant planned downtimes. It is desirable to limit the effects of these downtimes as much as possible since they could affect the availability of mission critical systems, potentially resulting in productivity and financial losses for organizations.

If the system being upgraded is a distributed system having multiple independent members where the software is located in the members' local directories, then in one approach, the upgrade can be performed individually at each member so that other members do not suffer downtime while the affected member is being upgraded. However, problems arise with this approach if it is implemented in networked and shared filesystem environments in which multiple members operate with the same shared software installations. Some examples of this type of configuration are when multiple members access the same software installation at a shared filesystem using the NFS (network file system) mechanism or in the Cluster File System such as the Oracle Cluster File System (OCFS) available from Oracle Corporation of Redwood Shores, Calif. With this type of architecture, since the application files are shared, performing a rolling upgrade could result in all members being shutdown during the upgrade process, resulting in total unavailability for the systems during the downtime.

For operating system (OS) upgrades, one approach for handling this is provided in the Tru64/TruCluster system which offers OS level support to perform rolling upgrades on their Cluster File System. The TruCluster model uses tagged files and kernel parameters to support multi-versioning and version switching. However, this approach may result in inefficient performance involving 2n–1 reboots to the networked members when performing the OS upgrades where n is the number of members being upgraded.

Therefore, to address these and other problems, what is described herein is an improved method and mechanism for performing rolling upgrades, e.g., to shared software installations in a distributed environment. The present approach eliminates or minimizes extraneous downtime when performing a rolling upgrade, thereby improving performance and availability for users of the shared software installation. In one embodiment, a rolling upgrade is performed by defining a private symbolic link for each member that is upgraded to reference the upgraded version of the shared software installation. This approach can be performed upon any computing system, whether single node (e.g., a multi-instance application on a single computer) or a multi-node system (e.g., a cluster or network of stations).

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

FIGS. 4A-G and 5A-I illustrate processes for performing rolling upgrades.

DETAILED DESCRIPTION

The present invention provides a method and mechanism for performing a rolling upgrade to shared software installations in a distributed environment, e.g. for a networked, shared filesystems. The present approach eliminates or minimizes extraneous downtime when performing a rolling upgrade, thereby improving performance and availability for users of the shared software installation.

Figure 1:
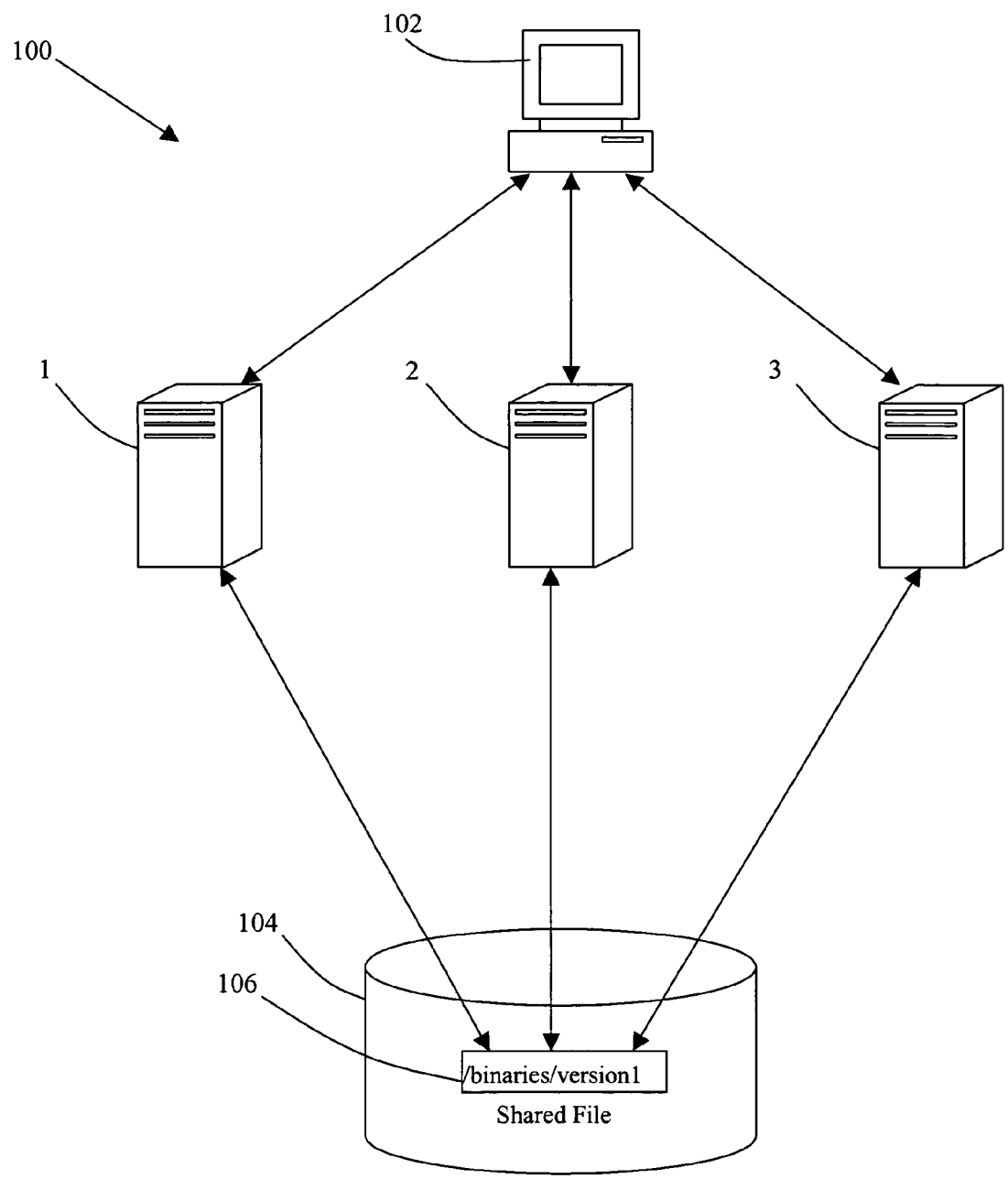
FIG. 1 shows an example of a system in which multiple members access the same shared files.

FIG. 1 shows an example of a system 100 in which multiple networked members 1, 2, 3 access shared files 106 in a shared file system. Assume that each of the members 1, 2, and 3 are servers running an enterprise software that support a large number of clients 102 in the system 100. The installed software application running on each of the members 1, 2, and 3 are executed from the shared files 106 in the shared file system rather than from application executables in their private file systems.

In this type of architecture, performing a rolling upgrade could cause significant downtime in the system 100. This is because one has to stop all the instances of the application running the distributed members 1, 2, 3 to change or upgrade the installed software in the shared files 106. In other words, none of the clients 102 will be able to perform work in the system while an upgrade is being performed in this approach, since all members that require access to shared files 106 would be down.

Embodiments of the present invention provide an improved method and mechanism for performing rolling upgrades that do not require all members using the shared file system to be brought down when upgrading or changing installed software applications. In one embodiment, the rolling upgrade is performed using private symbolic links (PSL).

At this point, it is helpful to generally describe a symbolic link. A symbolic link is a logical reference from a first file/pathname to a second file/pathname, which is most commonly used in UNIX-based systems. Most operations (e.g., read and execute operations) that are called to operate upon the symbolic link are instead redirected to operate upon the filename referenced by the symbolic link.

In a present embodiment, a private symbolic link mechanism is used to perform a rolling upgrade. Unlike a standard symbolic link, a PSL does not provide a universally visible symbolic link between two file/pathnames. Instead, the PSL makes the link between two filenames visible only to members specified or authorized for the PSL. The present disclosure defines the semantics of a PSL that is employed in one embodiment of the invention for performing rolling upgrades.

Figure 2A:
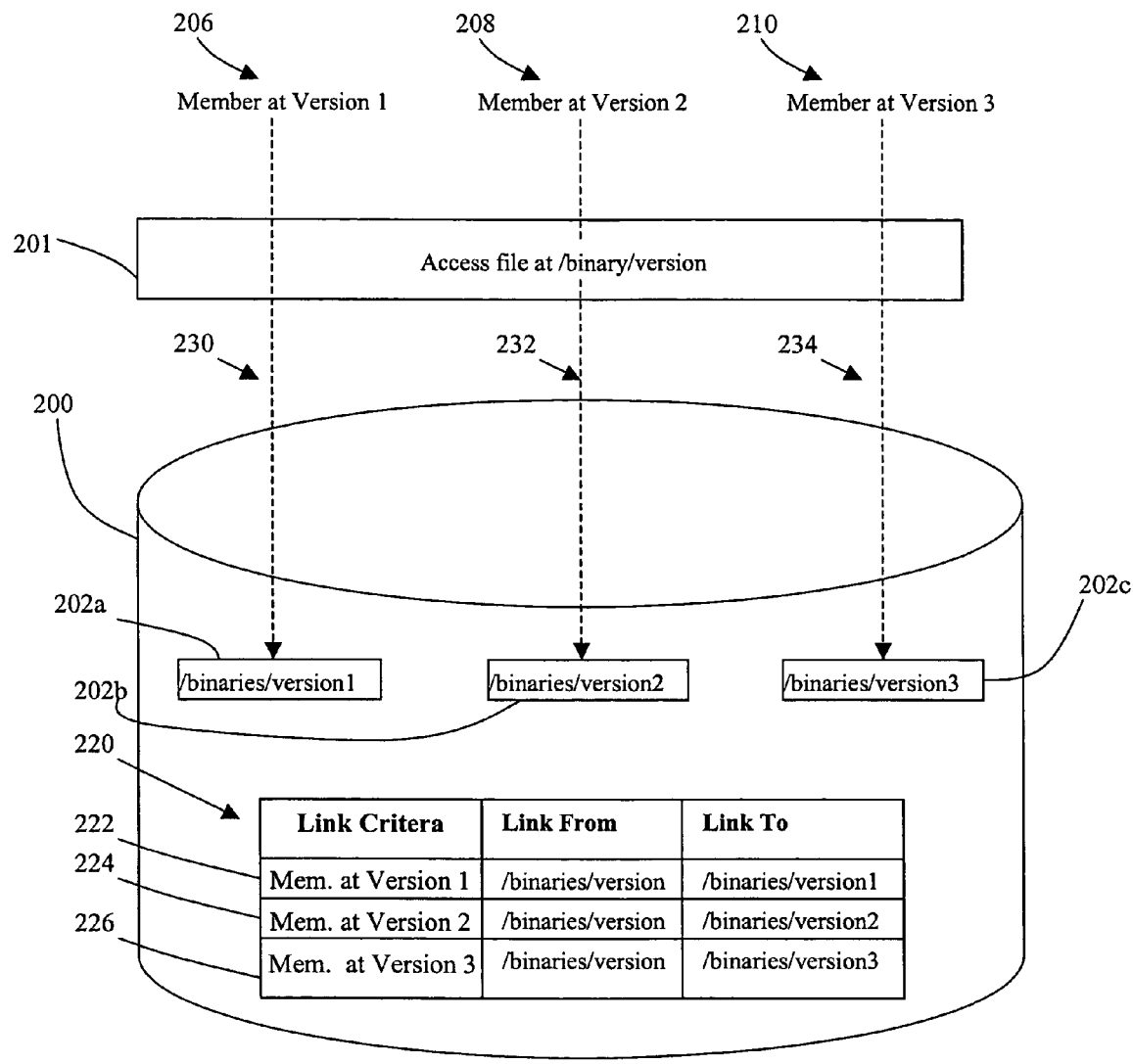
FIG. 2A generally illustrates a private symbolic link according to an embodiment of the invention.

FIG. 2A illustrates this aspect of a PSL. In FIG. 2A, a networked storage device 200 includes a shared file system. Three members 206, 208, and 210 are shown which access the shared file system. Assume that the pathname of the shared file that is accessed by all three members is "/binaries/version". Three different versions of the file associated with the pathname "/binaries/version" have been stored in networked storage device 200. A first version 202*a* actually has the pathname "/binaries/version1", a second version 202*b* has the pathname "/binaries/version2", and a third version 202*c* has the pathname "/binaries/version3".

It is desired to establish a configuration of the system such that different entities in the system will symbolically link from the same pathname/filename to different files in the shared file system. This is accomplished in the present embodiment by establishing one or more private symbolic links in which a link criteria or link configuration will determine which file will be referenced by the symbolic link for particular entities in the system. As used herein, such entities include any object, member, application or individual which is capable of using or accessing a shared file. For the purposes of illustration, the term "member" will be used instead of "entities" in the rest of this description.

An example structure 220 is shown in FIG. 2A which identifies some example link configuration data for a private symbolic link in this example. In the present example, the structure 220 includes "link criteria" information which contains the matching rule or criteria that identifies which entities or categories of entities corresponds to the PSL definition. This means that the PSL will only be applied to an entity if that entity is a member of the group defined by the link criteria information for the PSL. More than one entity or member may be a member of this group, and therefore associated with the same PSL. The "link from" information identifies the symbolic link name and/or the name for which linking is desired. The "link to" information identifies the target filename or pathname for the private symbolic link. It is noted that structure 220 is merely illustrative, and not meant to be limiting, since any suitable link configuration approach that may be employed, including modification of OS/directory files to establish or define a private symbolic link. As can be appreciated by those skilled in the art, it is clear that any number of approaches may be used to implement configuration data for a private symbolic link.

In structure 220, a first entry 222 has been configured to include a link criteria definition that applies to all members having a given software application at version 1. This means that the PSL associated with entry 222 only applies to a member only if the member has the stated software application at version 1. If the member is running the software application at any other version number, then the PSL defined by entry 222 does not apply to that member. Entry 222 is configured such that it "link from" a filename/pathname for "/binaries/version". The "link to" information for entry 222 has been defined as "/binaries/version1". This means that any member that is a member of the group defined by the link criteria information for entry 222 will have a private symbolic link from the "/binaries/version" file/pathname to the "/binaries/version1" file/pathname.

Similarly, it can be seen that entry 224 has link criteria information that defines a PSL which applies to members running the software application at version 2. Entry 224 is configured such that it "link from" a filename/pathname for "/binaries/version". The "link to" information for entry 224 has been defined as "/binaries/version2". This means that any member that is a member of the group defined by the link criteria information for entry 224 will have a private symbolic link from the "/binaries/version" file/pathname to the "/binaries/version2" file/pathname. Entry 226 has link criteria information that defines a PSL which applies to members running the software application at version 3. Entry 226 is configured such that it "link from" a filename/pathname for "/binaries/version". The "link to" information for entry 226 has been defined as "binaries/version3". This means that any member that is a member of the group defined by the link criteria information for entry 226 will have a private symbolic link from the "/binaries/version" file/pathname to the "/binaries/version3" file/pathname.

In the example of FIG. 2A, assume that member 206 is running the software application at version 1, member 208 is running the software application at version 2, and member 210 is running the software application at version 3. Since member 206 is a member of the group for the PSL defined by entry 222, when member 206 seeks to access the shared file "/binaries/version", a private symbolic link 230 will instead cause member 206 to access the file 202*a* corresponding to the file/pathname "binaries/version1". Since member 208 is a member of the group for the PSL defined by entry 224, when member 208 seeks to access the shared file "/binaries/version", a private symbolic link 232 will instead cause member 208 to access the file 202*b* corresponding to the file/pathname "/binaries/version2". Similarly, member 210 is a member of the group for the PSL defined by entry 226, and therefore, when member 210 seeks to access the shared file "/binaries/version", a private symbolic link 234 will instead cause member 210 to access the file 202*c* corresponding to the file/pathname "/binaries/version3".

Figure 2B:
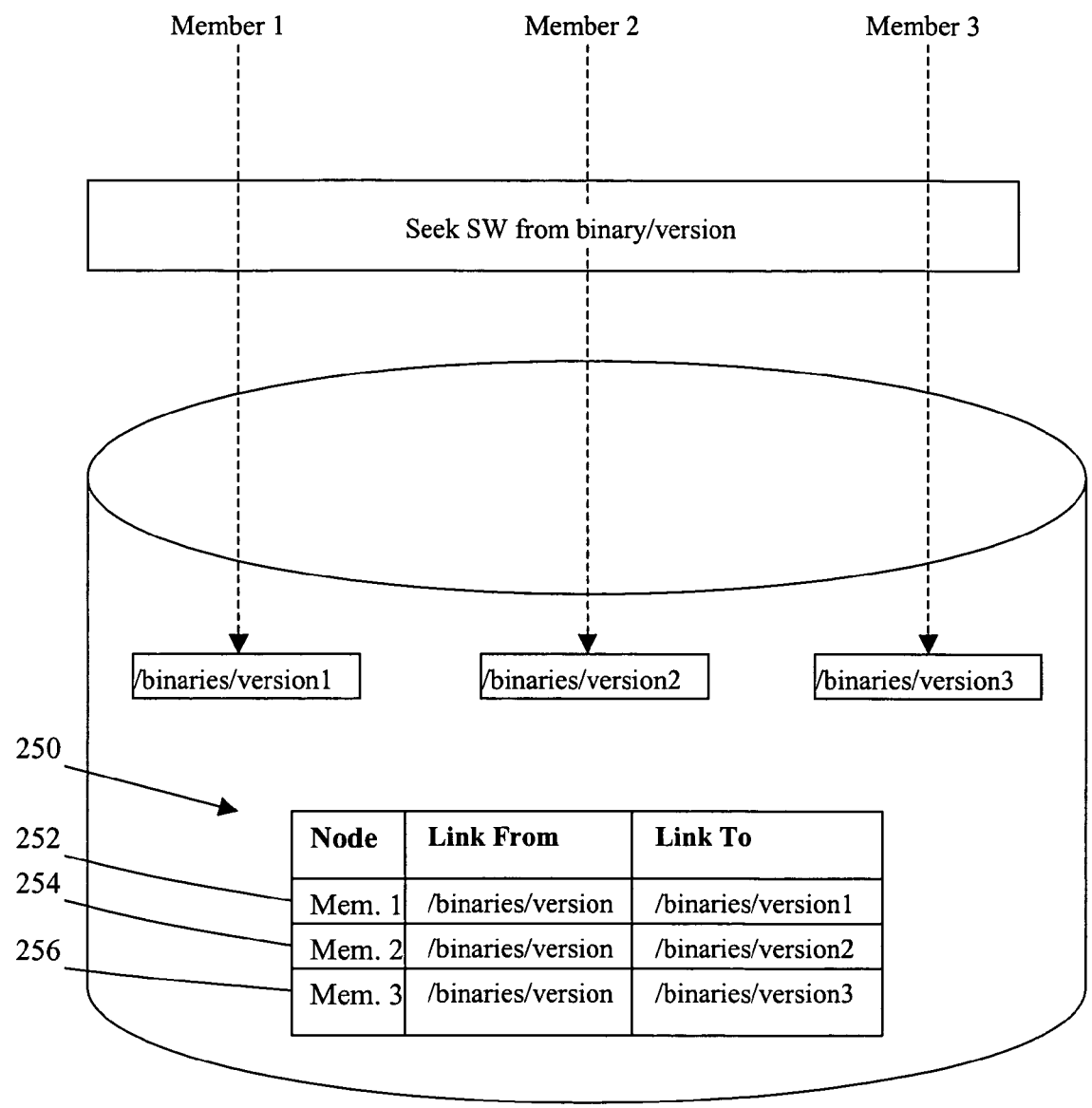
FIG. 2B generally illustrates a member private symbolic link according to an embodiment of the invention.

One specific type/variant of a PSL that can be created is a member private symbolic link (MPSL). The MPSL creates a symbolic link that only applies to the member defined for the MPSL. Therefore, the member of the group defined for a MPSL may be limited to a single identified member. FIG. 2B shows an example of a configuration structure 250 that may be used to define a set of MPSLs. Structure 250 includes "member" definition information which contains the identity of the particular member corresponding to a MPSL definition. This means that the MPSL will only be applied to a member if that member is associated or defined for the MPSL. As before, the "link from" information identifies the symbolic link name and/or the name for which linking is desired. The "link to" information identifies the target filename or pathname for the private symbolic link.

Entry 252 in structure 250 has the name "member 1" defined in the member column. This means that the PSL associated with entry 252 only applies to the member identified as "member 1". Entry 252 is configured such that it "link from" a filename/pathname for "/binaries/version". The "link to" information for entry 252 has been defined as "/binaries/version1". This means that member 1 will have a private symbolic link from the "/binaries/version" file/pathname to the "/binaries/version1" file/pathname. Similarly, it can be seen that entry 254 has been defined to only apply to the member named "member 2". Entry 254 is configured such that it "link from" a filename/pathname for "/binaries/version". The "link to" information for entry 254 has been defined as "/binaries/version2". This means that member 2 will have a private symbolic link from the "/binaries/version" file/pathname to the "/binaries/version2" file/pathname. Entry 256 has been defined to only apply to the member named "member 3". Entry 256 is configured such that it "link from" a filename/pathname for "binaries/version". The "link to" information for entry 256 has been defined as "/binaries/version3". This means that member 3 will have a private symbolic link from the "/binaries/version" file/pathname to the "/binaries/version3" file/pathname.

In the examples of FIGS. 2A and 2B, although "/binaries/version" resolves into the private copies "/binaries/version[1,2,3]", these copies are stored on the shared storage but are not accessible except by members that meet the link criteria.

Figure 3A:
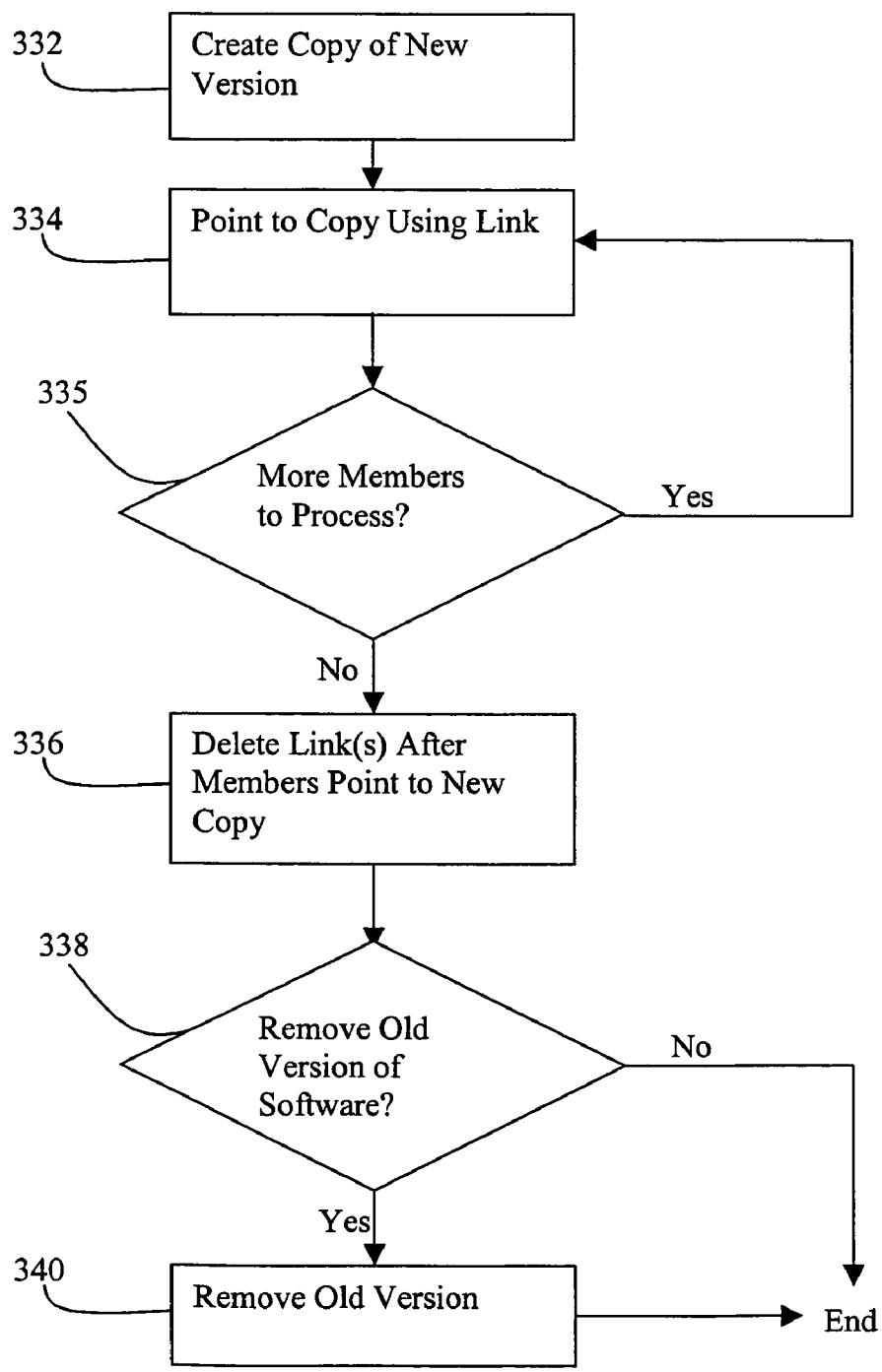
FIGS. 3A and 3B show flowcharts of processes for performing rolling upgrades to a software installation according to embodiments of the invention.

The private symbolic link can be used to implement a process for performing rolling upgrades to software. FIG. 3A shows a flowchart of a process for implementing a rolling upgrade according to an embodiment of the invention. At 332, a shared copy of the new version of the software is created in the shared file system without removing the old version of the software. As noted previously, there are numerous approaches that can be taken to create the new version of the software. One approach is to copy the old version of the software to another part of the shared file system, and to apply patches or a patch set associated with the new version to the software copy. Another approach is to move or create an entirely new version of the software without copying from the old version. In either case, the new version of the software (or specific files associated with the new version) now co-exists in the shared file system with the old version of the software, but having a different pathname or filename from the old version.

In the approach of FIG. 3A, only a single copy of the new version of the software is used in the shared file system. During the rolling upgrade, each member that is to be upgraded will access this single copy of the new version of the software.

At 334, links are configured such that members that are to be upgraded to the new version of the software will point to the newly created copy of the new version of the software. For a rolling upgrade, this process of pointing the members will occur in a staggered manner such that availability to at least one or more members is retained throughout the upgrade process. A determination is made whether there are any additional members to process (335). If so, then action 334 is repeated for each additional member to create a link to the new version. At 336, the links are deleted after the members point to the new version of the software.

In an embodiment, the MPSL mechanism is used to providing this linking capability. With this approach, a member is identified for which the rolling upgrade is desired. During the upgrade, the member and/or its running software application is brought down. It is noted that in this approach, only the specific member presently identified for the rolling upgrade is brought down. All other members still operating against the old version of the software can continue running without interruption. After the member has been brought down, a private symbolic link is created for the identified member. The private symbolic link creates a symbolic link between the file/pathname of the old version and the file/pathname of the new version of the software. The private symbolic link only applies to the members of the group associated with the MPSL. In one embodiment, the private symbolic link is a member private symbolic link, and the only member of the group associated with the MPSL is the identified member. After linking occurs, the member is brought back up. Because of the MPSL, the software application will be brought up automatically referencing the application files from the new version of the software. A determination is made whether additional members need to be upgraded during the rolling upgrade. If so, the process is repeated until all members that need to be upgraded have been upgraded.

Once all relevant members have been upgraded, a determination is made whether to remove the old version of the software (338). There are many reasons not to remove the old software. For example, it is possible that there is still a reason to continue using the old software version on some of the members in the network. If, however, the decision has been that the old software version is no longer needed, then the old software version is removed (340).

Figure 3B:
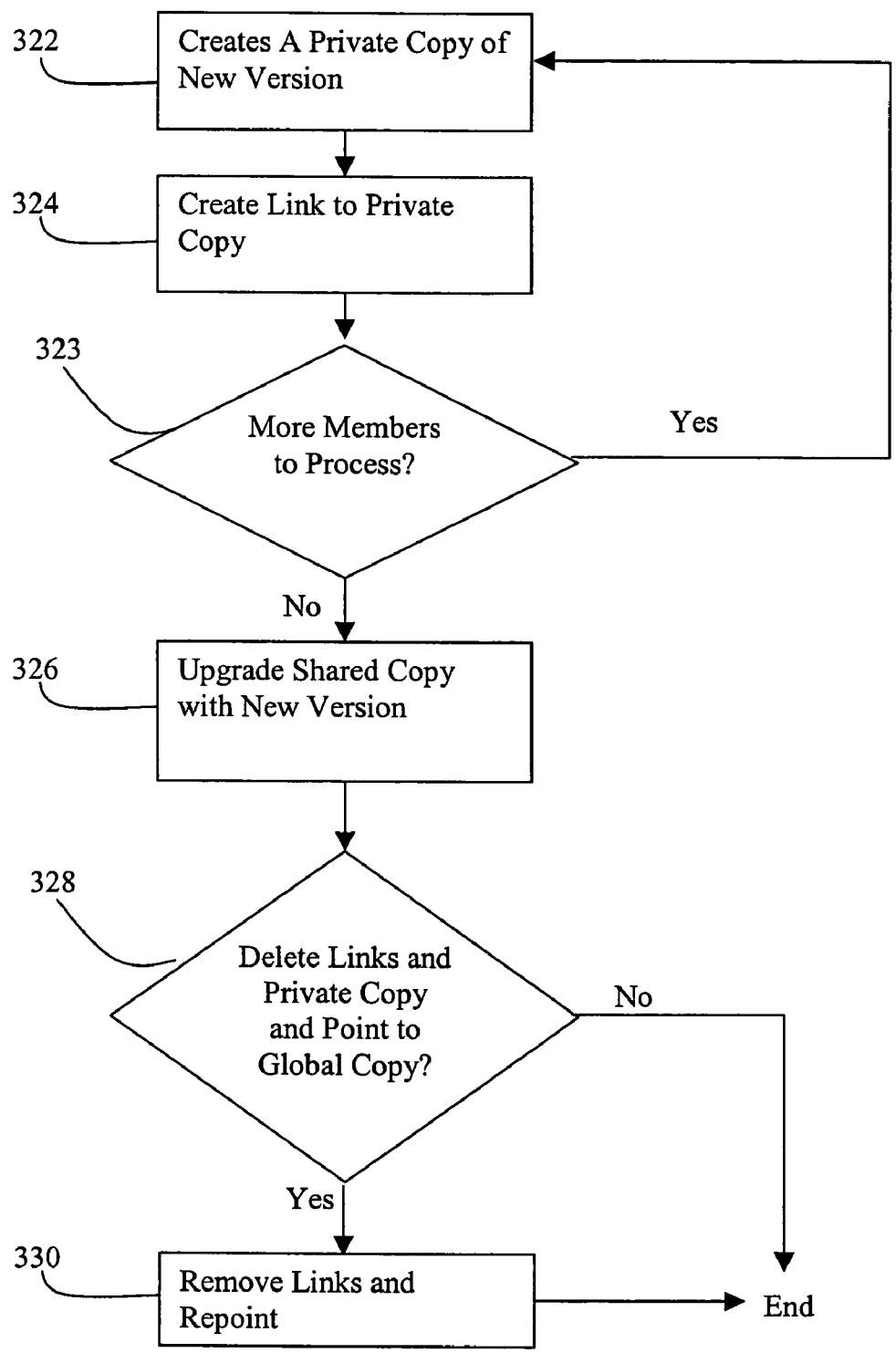

In the embodiment of FIG. 3A, all members that upgrade will have a private symbolic link that references the same copy of the new version of the software. In an alternate embodiment, multiple copies of the files for new version(s) of the software may concurrently exist. In this situation, the different members may have different sets of private symbolic links that point to different sets of files. This is useful, for example, if the configuration files differ between members, even for the same version of the software. FIG. 3B shows a process flow for this alternate approach.

At 322, a member creates a private copy of a new version of the software. The private copy is created in the shared file system without removing the old version of the software. Any appropriate approach can be taken to create the new private copy. The newly created copy of the new version of the software co-exists in the shared file system with the old version of the software, but having a different pathname or filename from the old version.

In the approach of FIG. 3B, multiple private copies of the new version(s) of the software can be created in the shared file system. In an embodiment, each member can be associated with its own private copy. Alternatively, even though multiple private copies are created, each private copy is capable of being associated with multiple members. During the rolling upgrade, each member that is to be upgraded will access the appropriate private copy relevant for the type of upgrade desired.

At 324, a link is configured such that the member that is to be upgraded will point to the newly created private copy of the new version of the software. For a rolling upgrade, this process of pointing the members will occur in a staggered manner such that availability to at least one or more members is retained throughout the upgrade process. The MPSL mechanism can be used to providing this linking capability. After linking occurs, the member is brought back up. Because of the MPSL, the software application will be brought up automatically referencing the application files from the new version of the software.

A determination is made whether there are any additional members to upgrade (323). If so, then another private copy of the new version is created (322) and a link is created to the new private copy (324). The process is repeated until all members that need to be upgraded have been upgraded. At 326, the link(s) are deleted after the member(s) point to the new version of the software. At a later point, the members can be configured to access the same copy of the new version of the software, rather than their own private copies.

Once all relevant members have been upgraded, a determination is made whether to remove the old version of the software (328). If the decision has been that the old software version is no longer needed, then the old software version is removed (330).

Figure 4A:
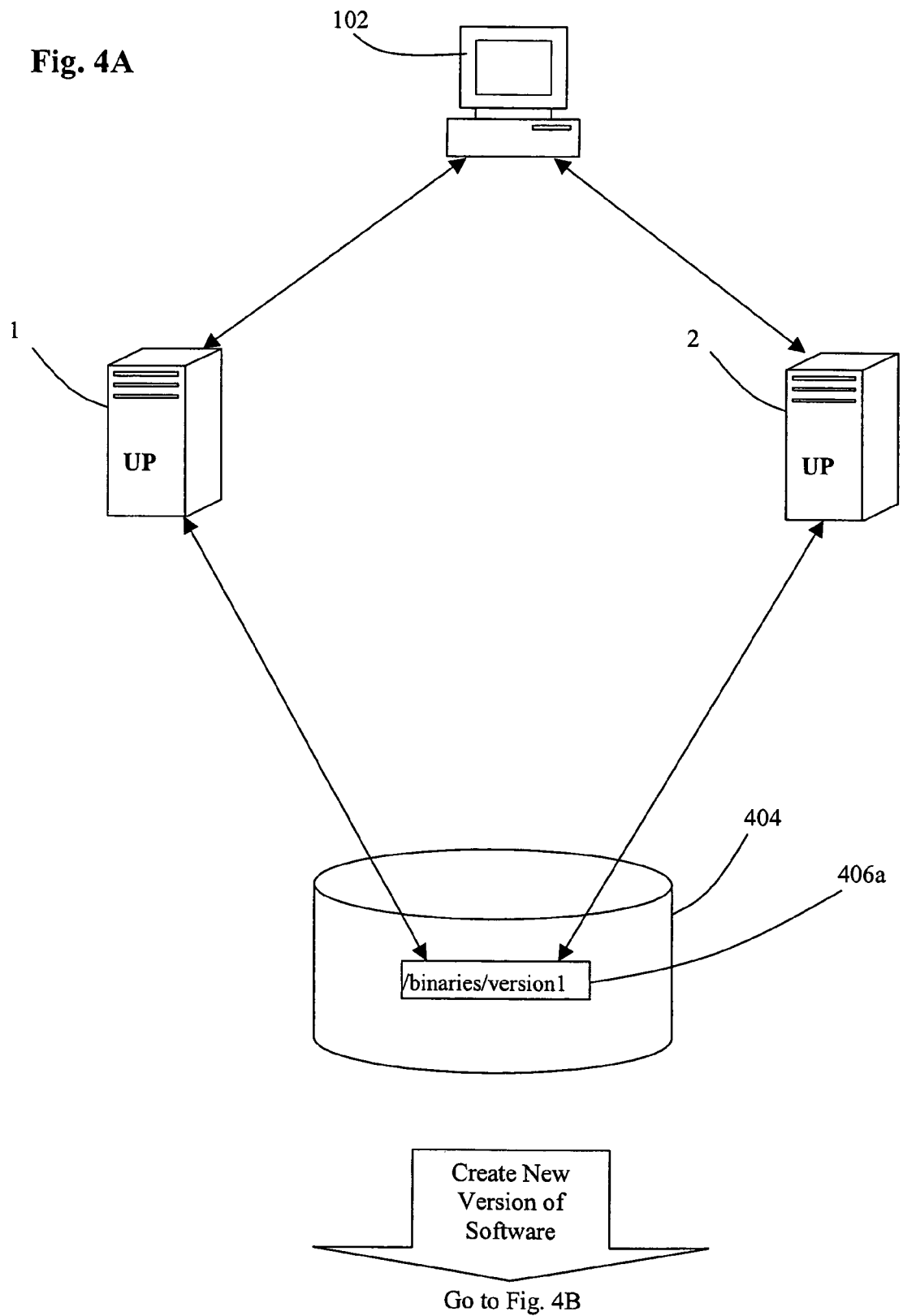

To illustrate the embodiment of the invention of FIG. 3A when performing a rolling upgrade, reference is now made to the system diagram of FIG. 4A. In this figure, two members (member 1 and member 2) are shown which run a software application using shared application files 406a from a shared file system. The present version of the software application is version 1. Consider if it is desired to perform a rolling upgrade from version 1 to version 2.

Moving to FIG. 4B, the first action is to create the files 406b corresponding to the new version of the software. In one embodiment, this accomplished by copying the old version 406a of the files to a new location on the shared file system within storage device 404. The patches associated with the new version of the software is applied to the copied software to form the new version 406b of the software application.

Figure 4C:
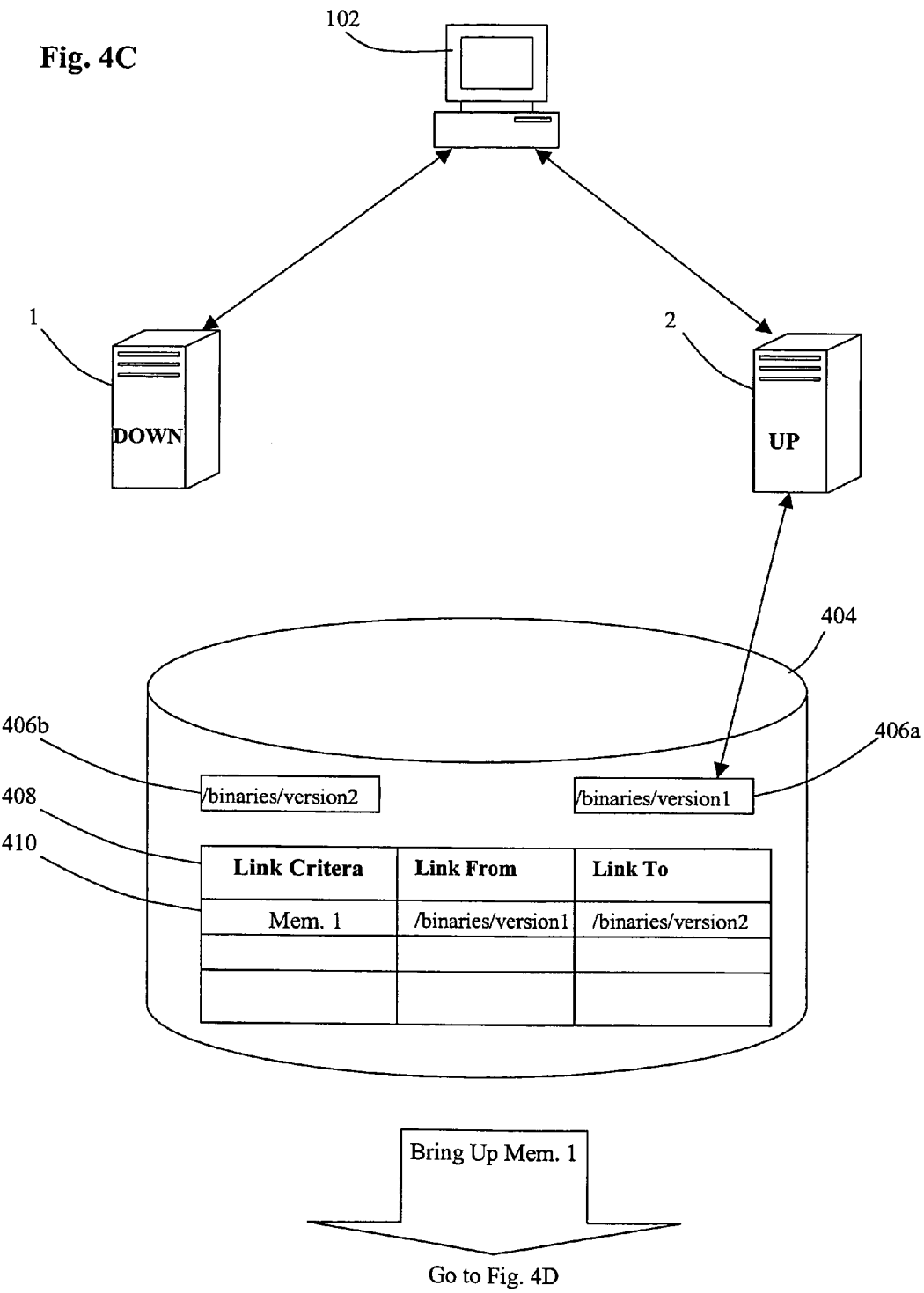

At this point, the first member to upgrade is identified. Assume that the first member to upgrade is member 1; Referring to FIG. 4C, member 1 is brought down. Several different approaches can be taken to bring down member 1. One approach is merely to shut down the software application. This approach may be particularly appropriate for higher-level software applications. Another approach is to entirely shut down the hardware at the node corresponding to member 1. This approach may be more appropriate for OS software. Other and additional approaches can be taken depending upon the specific requirements of the software application being upgraded.

A private symbolic link is created to associate member 1 with the new version 406b of the software. This is shown in FIG. 4C by adding entry 410 to PSL structure 408. In particular, member 1 is identified as the entity associated with the PSL corresponding to entry 410. The "link to" information for this entry 410 identifies the filename/pathname of the application file(s) for the new version 406b of the software. The "link from" information identifies the original file/pathname that the application is configured to access.

Figure 4D:
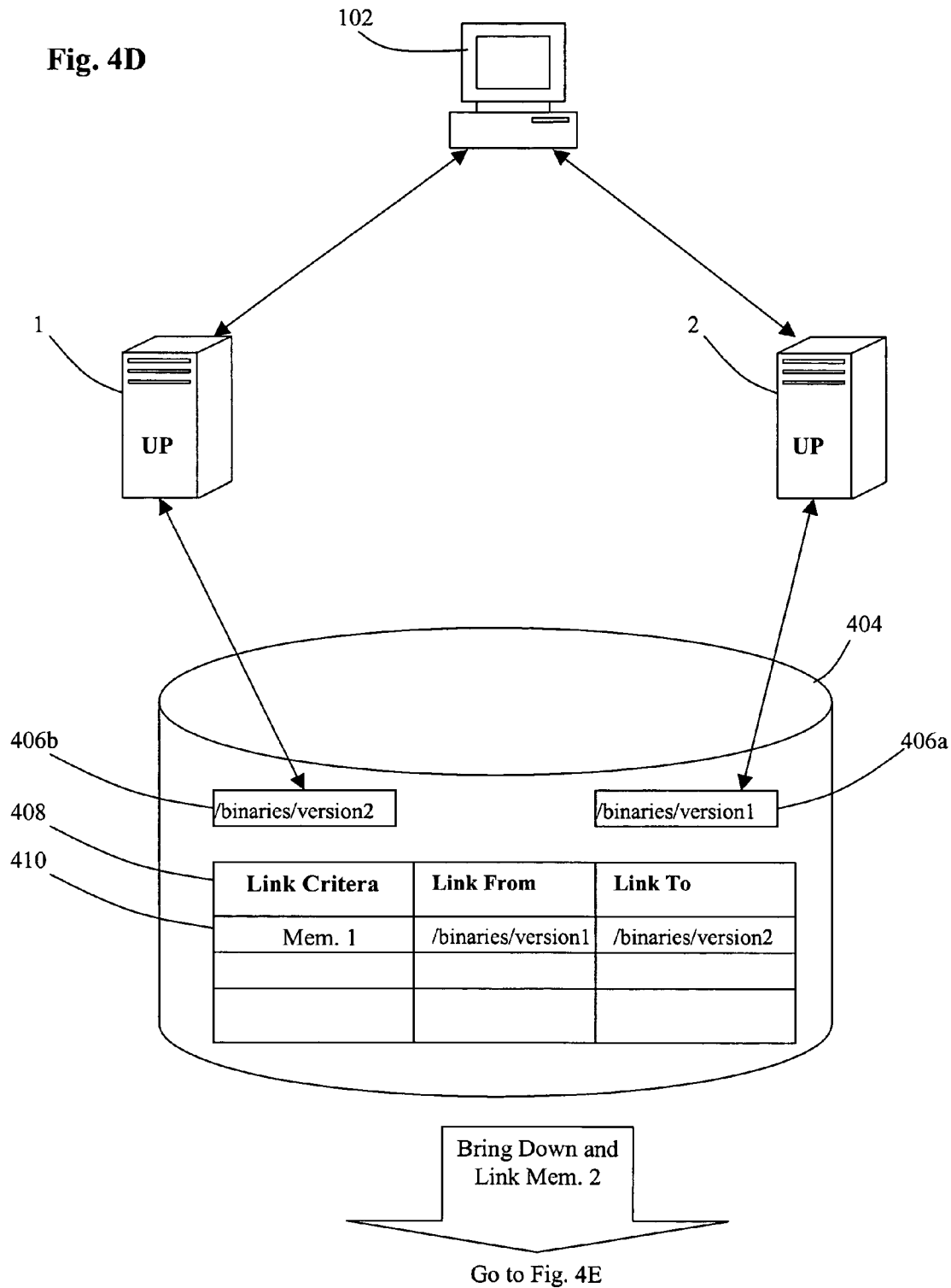

Referring to FIG. 4D, the next action is to bring up member 1. Because of the new PSL corresponding to entry 410, the application software will automatically start up based upon the application files associated with the new version 406b of the software.

At this point, it can be seen that members running both the old and new versions of the same software application are simultaneously running the system. In addition, it is noted that when performing the rolling upgrade, the process can be configured such that downtime only occurs for a single member at a time. However, multiple members can still be simultaneously shut down for upgrades within the scope of the invention. The advantage of this approach over the prior approaches is that less than all of the members need be brought down when performing a rolling upgrade for shared application files.

Figure 4E:
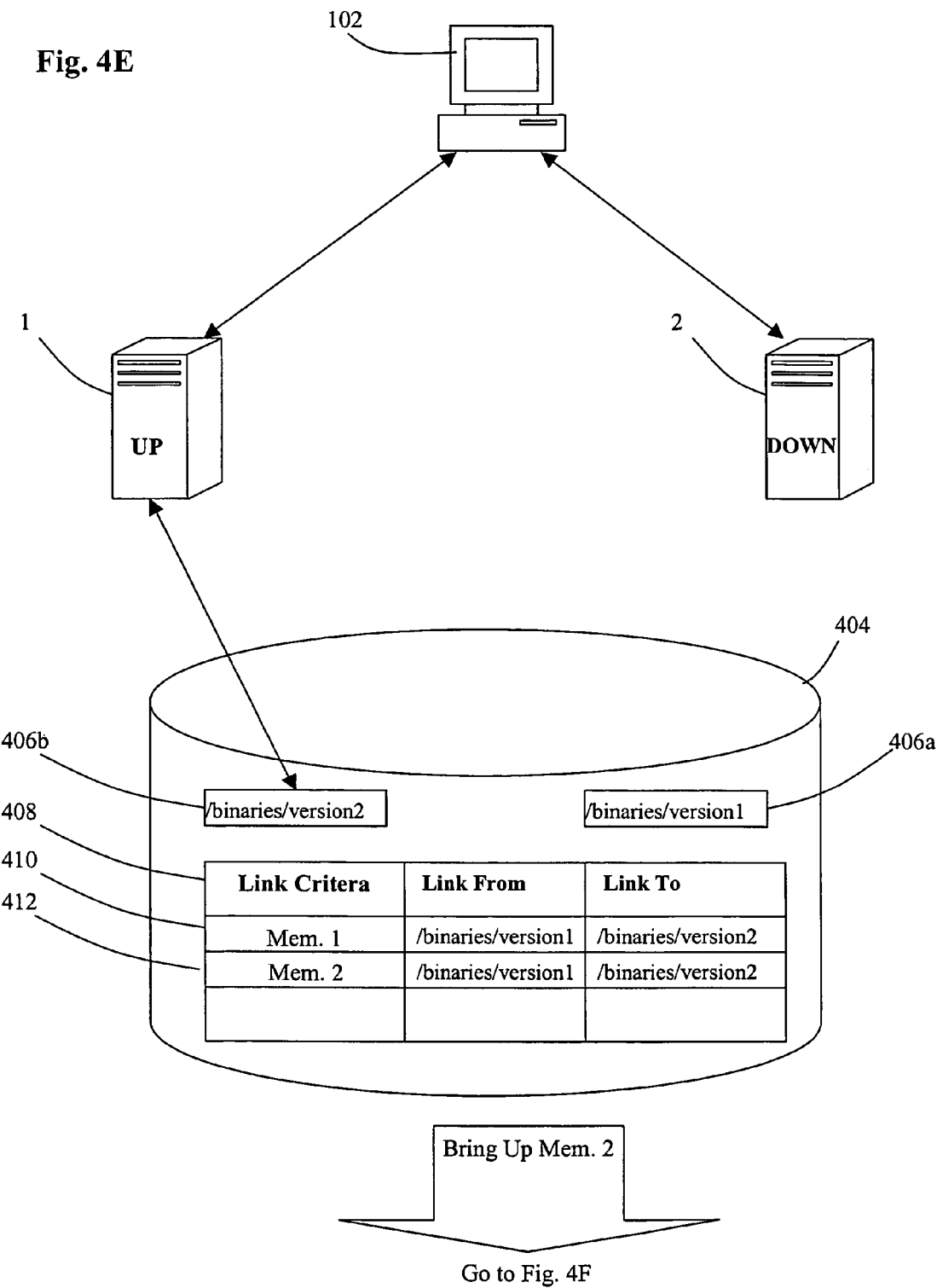

The next action is to upgrade member 2, which is still operating using the old version 406a of the software. Referring to FIG. 4E, member 2 is brought down. Once member 2 has been brought down, a private symbolic link is created to associate member 2 with the new version 406b of the software. This is shown in FIG. 4E by adding entry 412 to PSL structure 408. In particular, member 2 is identified as the entity associated with the PSL corresponding to entry 412. The "link to" information for this entry 412 identifies the filename/pathname of the application file(s) for the new version 406b of the software. The "link from" information identifies the original file/pathname that the application is configured to access.

Figure 4F:
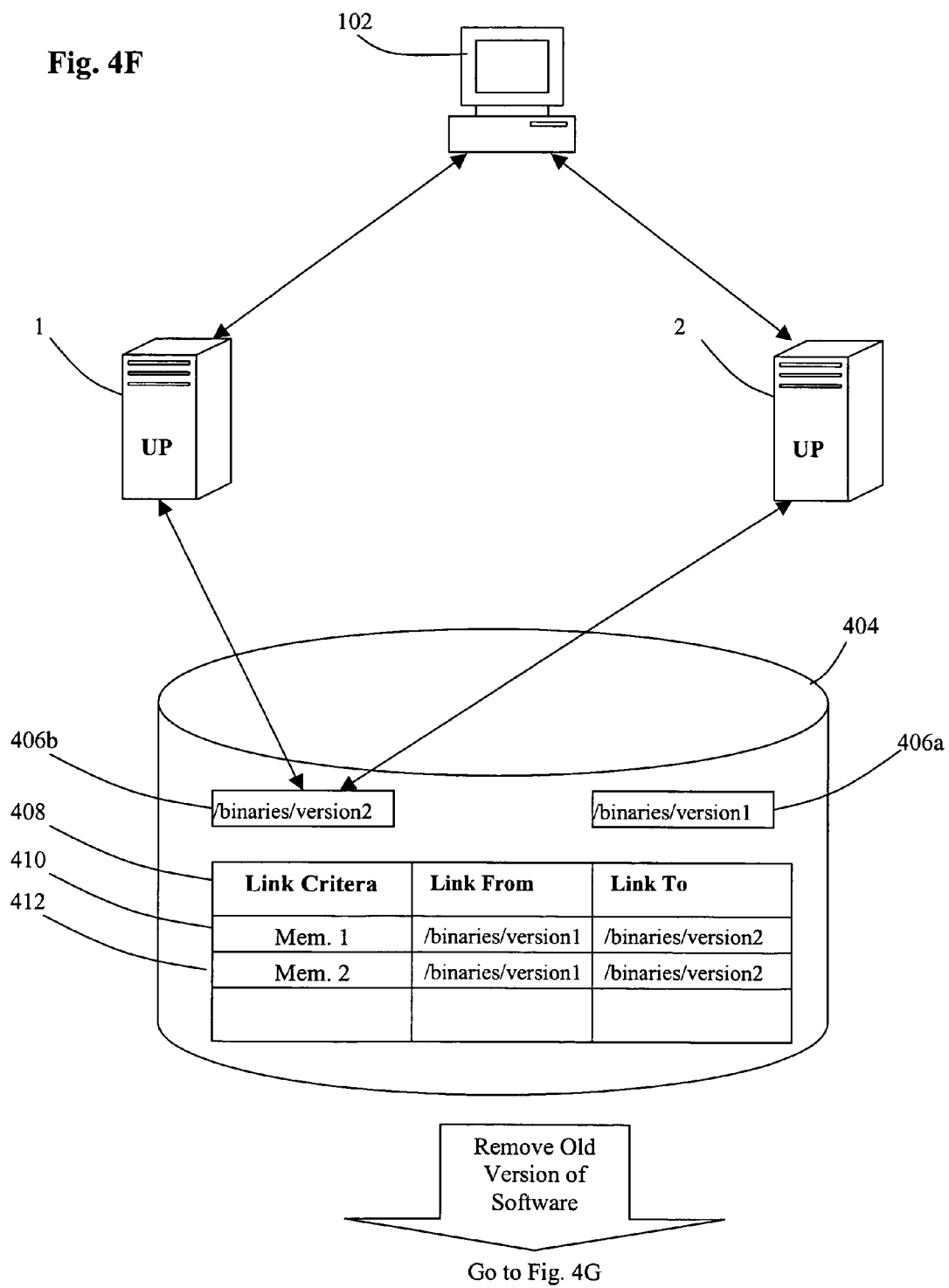

Referring to FIG. 4F, the next action is to bring up member 2. Because of the new PSL corresponding to entry 412, the application software will automatically start up based upon the application files associated with the new version 406b of the software.

Figure 4G:
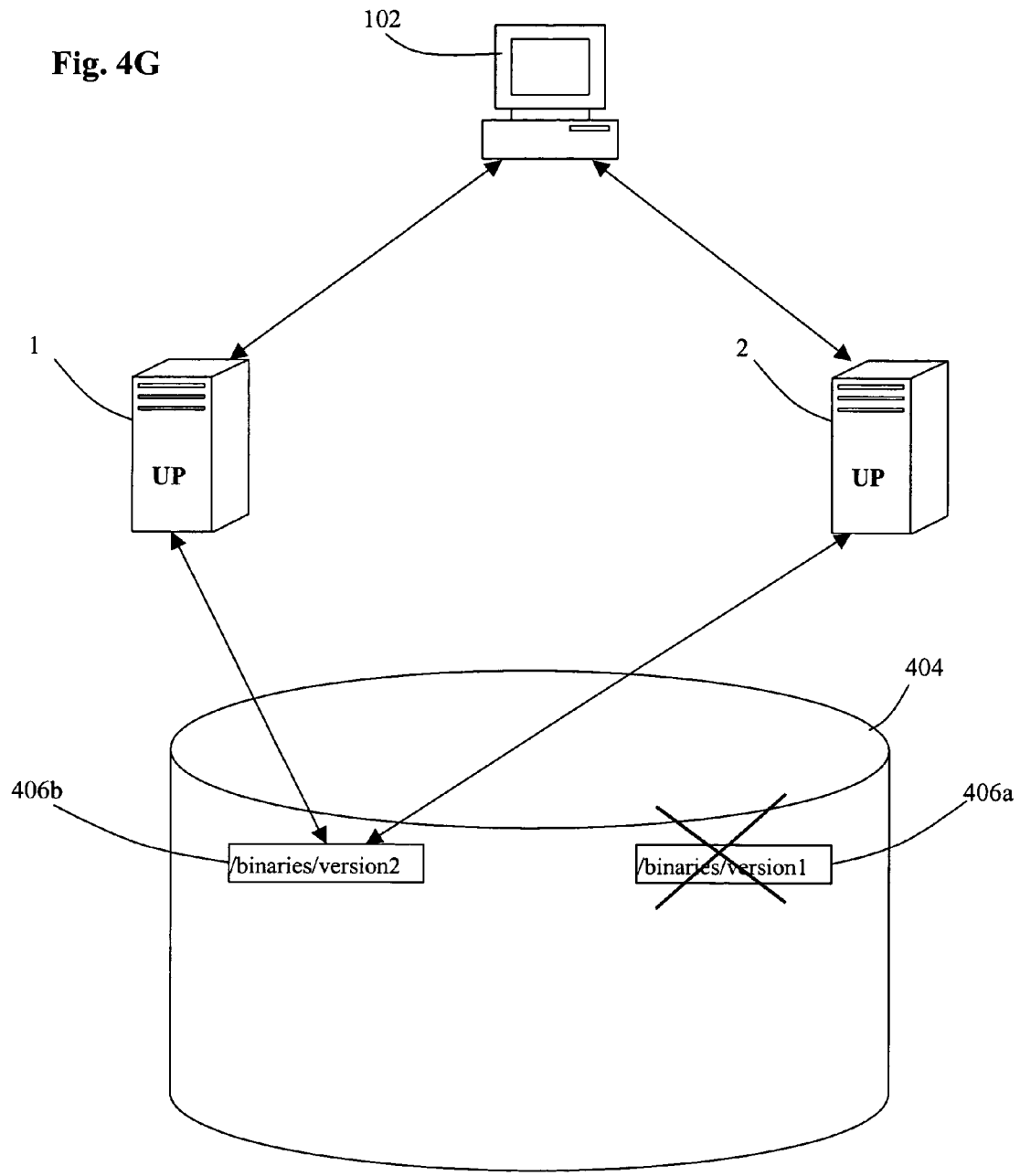

Since all members have now been upgraded, it is now possible to remove the old version 406a of the software and to remove the links. Turning to FIG. 4G, this figure shows the old version of the software 406a and the link structures being removed. At this point, the system is configured such that all future requests to access the software at the specified reference location will access the new version 406b of the software. The rolling upgrade process now ends.

Figure 5A:
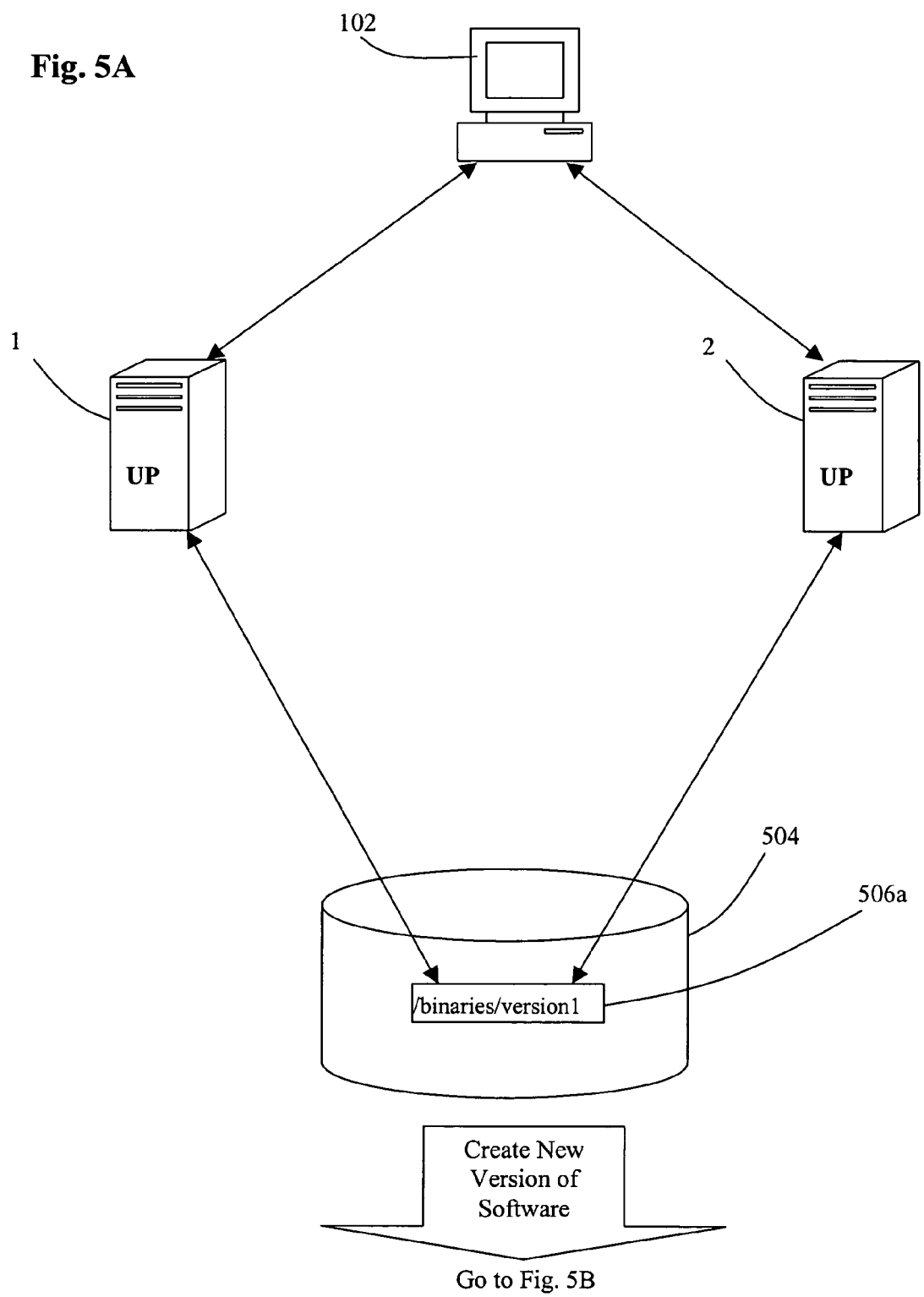

The process of FIG. 3B can be similarly implemented, differing in that multiple private copies of new version(s) of the software can be created. Thus, in this alternate approach, both member 1 and member 2 can be configured to point to different copies of the upgraded software. To illustrate the embodiment of the invention of FIG. 3B, reference is now made to the system diagram of FIG. 5A. In this figure, two members (member 1 and member 2) are shown which run a software application using shared application files 506a from a shared file system. The present version of the software application is version 1. Consider if it is desired to perform a rolling upgrade from version 1 to version 2.

Figure 5B:
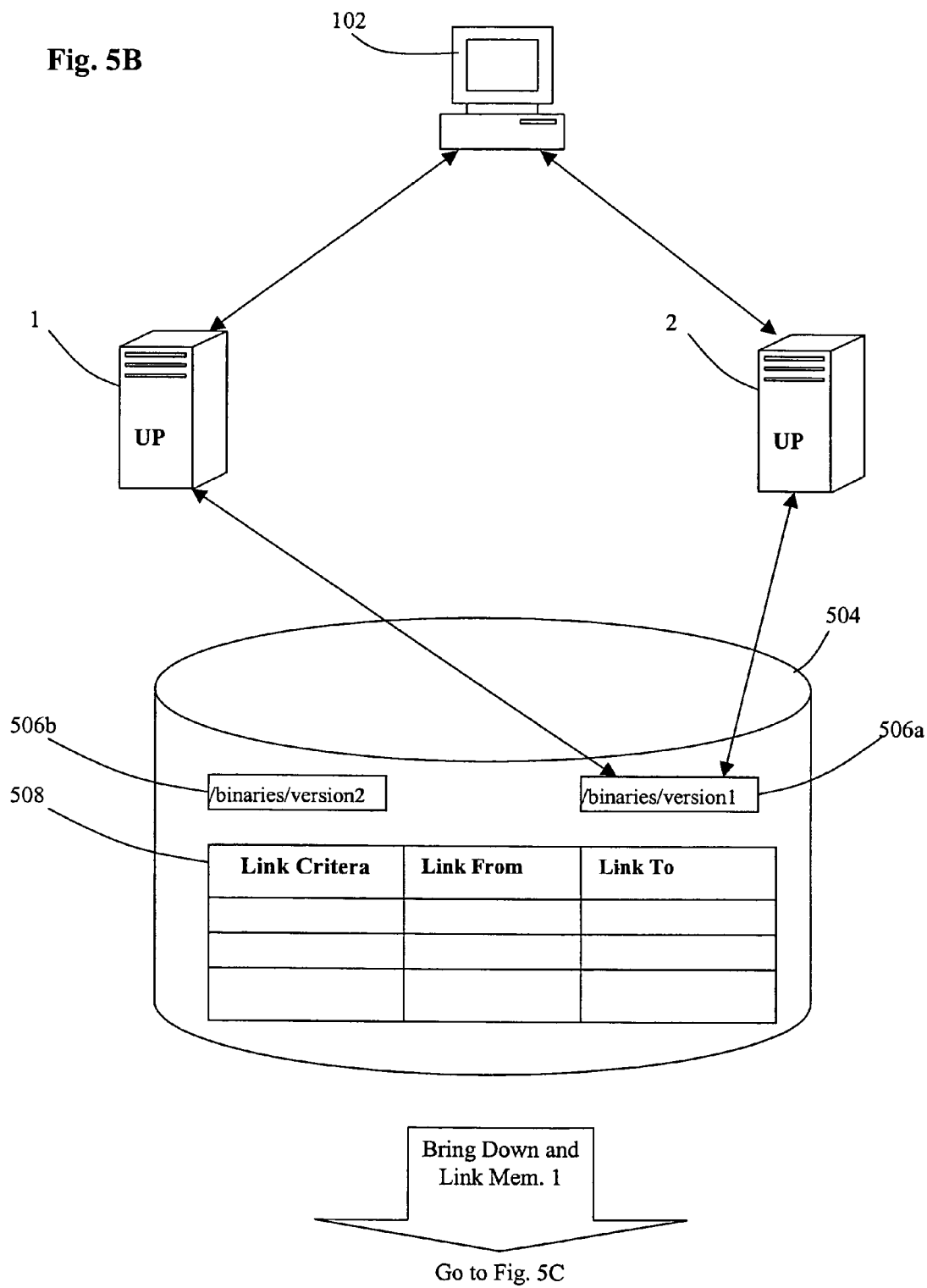

Moving to FIG. 5B, the first action is to create the files 506b corresponding to a first private copy of the new version of the software. In one embodiment, this accomplished by copying the old version 506a of the files to a new location on the shared file system within storage device 504. The patches associated with the new version of the software is applied to the copied software to form the new version 506b of the software application.

Figure 5C:
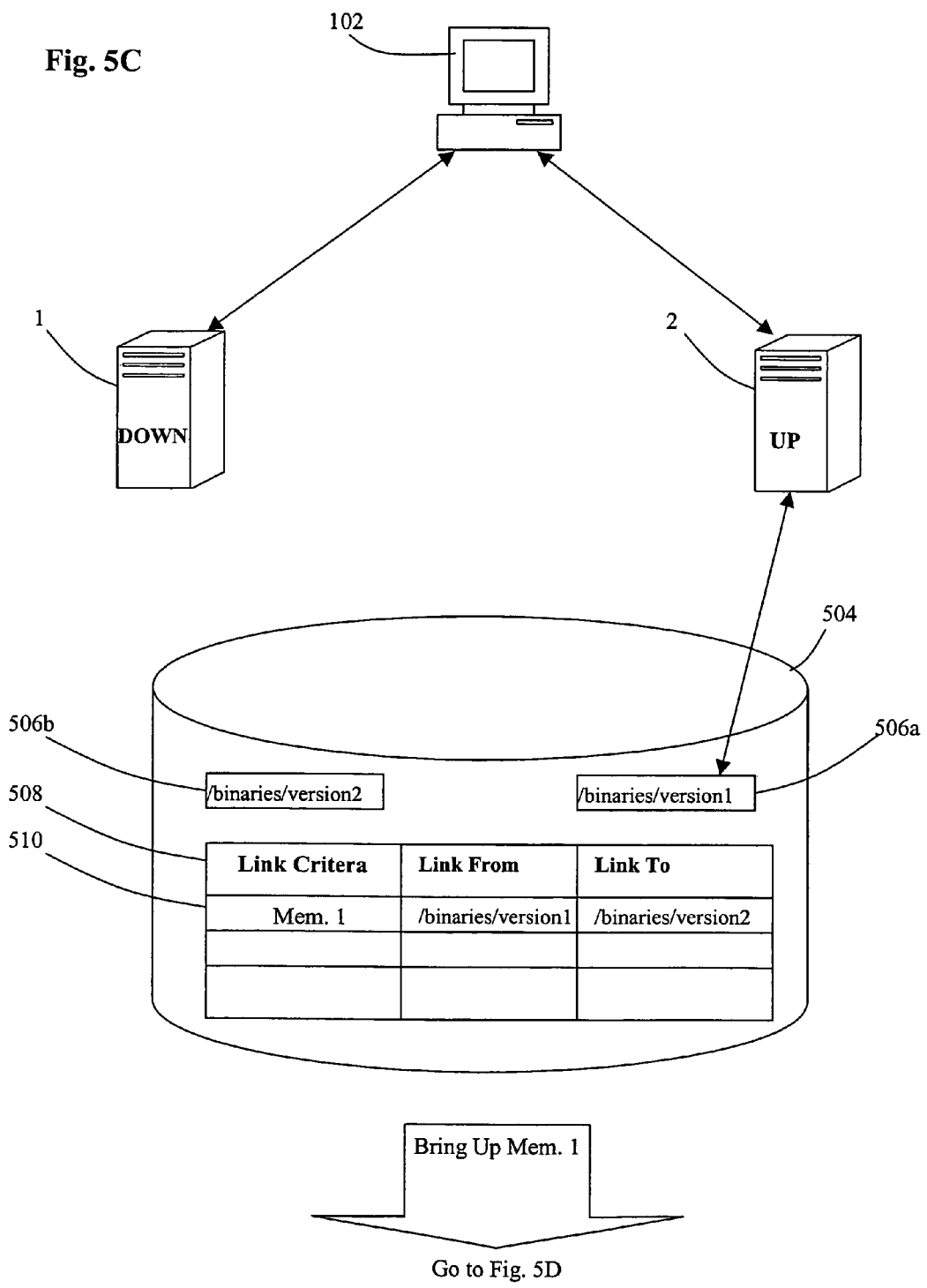

At this point, the first member to upgrade is identified. Assume that the first member to upgrade is member 1. Referring to FIG. 5C, member 1 is brought down. Several different approaches can be taken to bring down member 1. One approach is merely to shut down the software application. This approach may be particularly appropriate for higher-level software applications. Another approach is to entirely shut down the hardware at the node corresponding to member 1. This approach may be more appropriate for OS software. Other and additional approaches can be taken depending upon the specific requirements of the software application being upgraded.

A private symbolic link is created to associate member 1 with the new version 506b of the software. This is shown in FIG. 5C by adding entry 510 to PSL structure 508. In particular, member 1 is identified as the entity associated with the PSL corresponding to entry 510. The "link to" information for this entry 510 identifies the filename/pathname of the application file(s) for the new version 506b of the software. The "link from" information identifies the original file/pathname that the application is configured to access.

Referring to FIG. 5D, the next action is to bring up member 1. Because of the new PSL corresponding to entry 510, the application software will automatically start up based upon the application files associated with the new version 506b of the software.

Figure 5E:
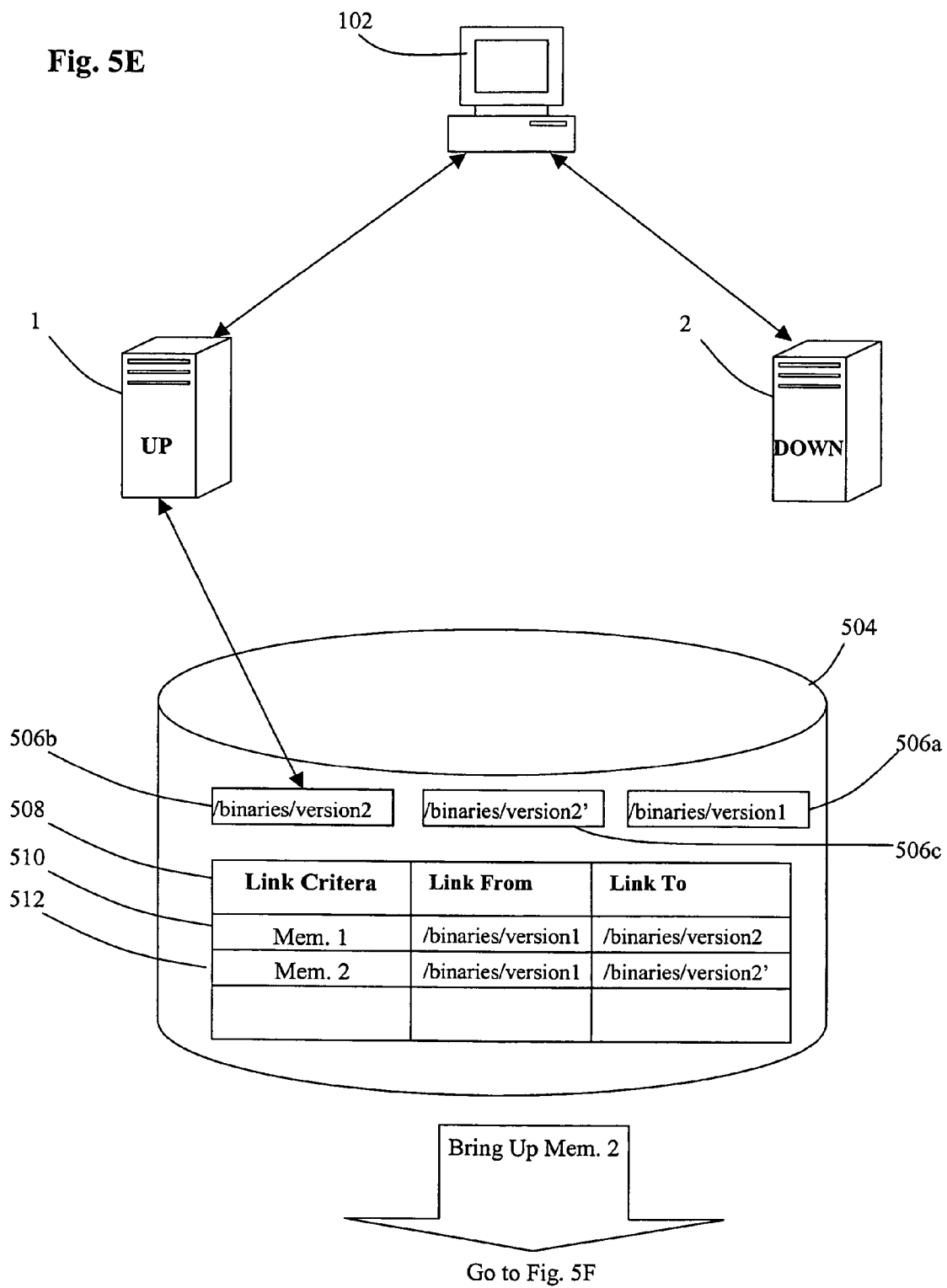

The next action is to upgrade member 2, which is still operating using the old version 506a of the software. Another private copy 506c of the new version of the software is created. Referring to FIG. 5E, member 2 is brought down. Once member 2 has been brought down, a private symbolic link is created to associate member 2 with the new private copy 506c of the new version of the software. This is shown in FIG. 5E by adding entry 512 to PSL structure 508. In particular, member 2 is identified as the entity associated with the PSL corresponding to entry 512. The "link to" information for this entry 512 identifies the filename/pathname of the application file(s) for the new private copy 506c of the software. The "link from" information identifies the original file/pathname that the application is configured to access.

Figure 5F:
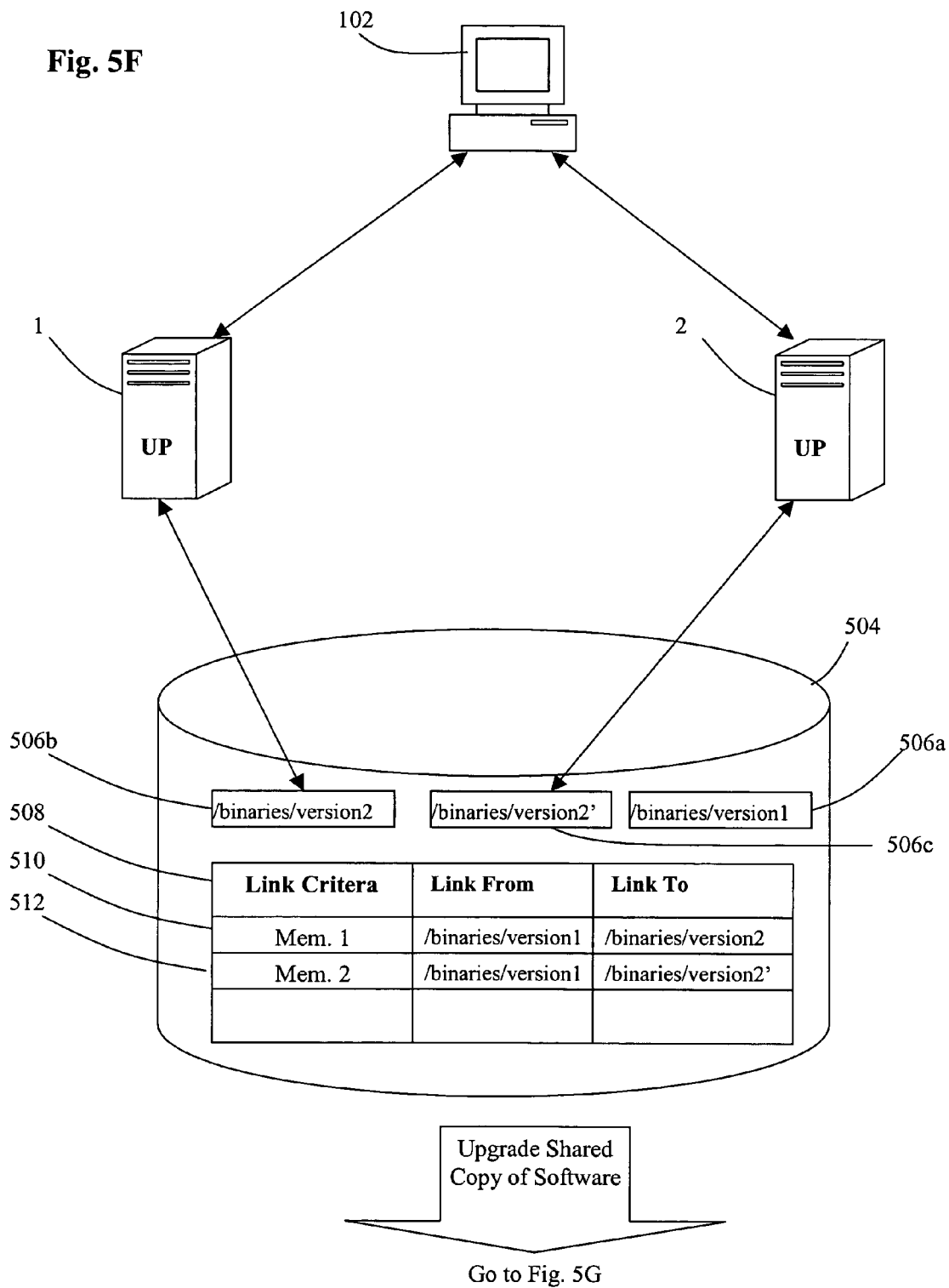

Referring to FIG. 5F, the next action is to bring up member 2. Because of the new PSL corresponding to entry 512, the application software will automatically start up based upon the application files associated with the new version 506c of the software.

Figure 5G:
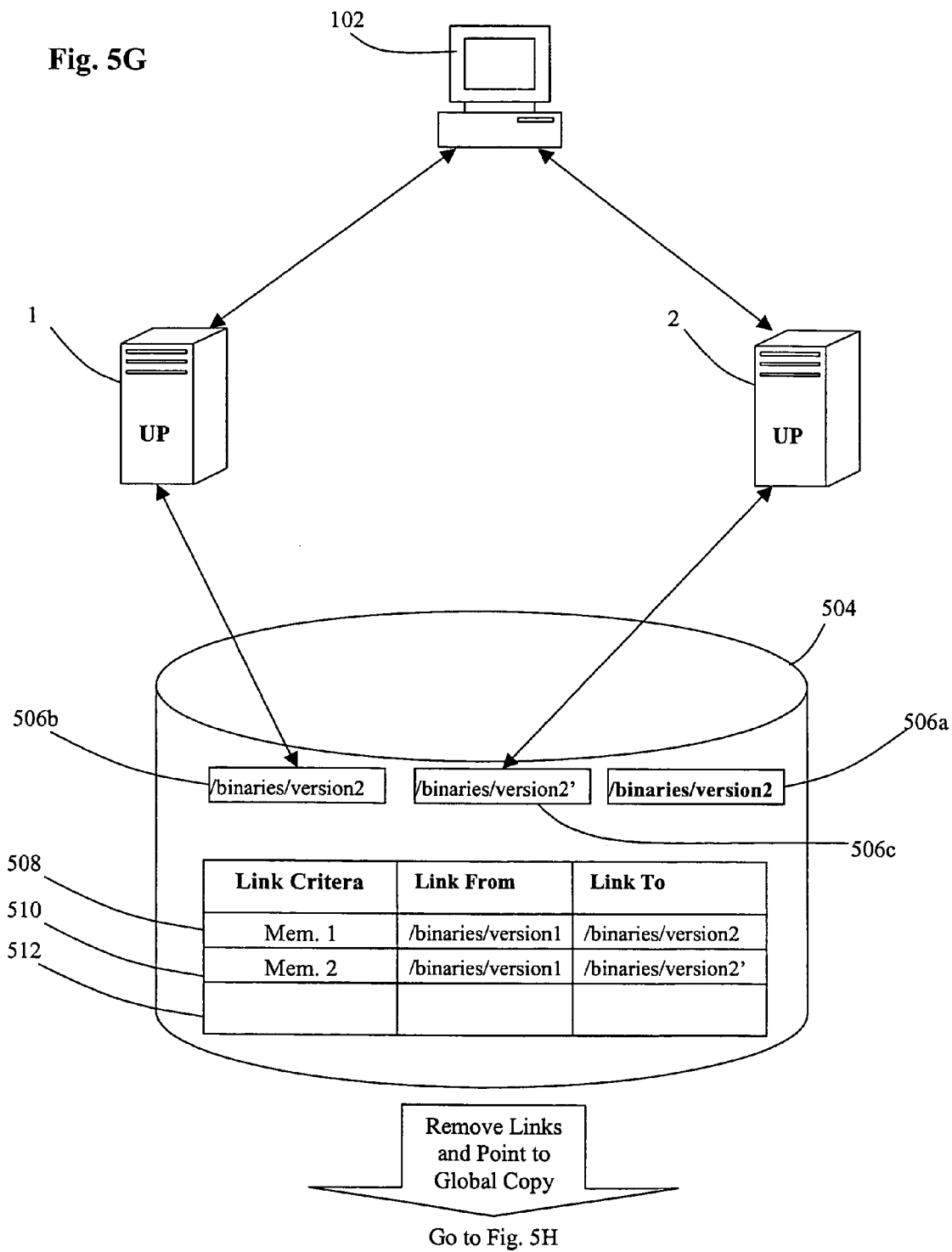

At this point, the system is configured such that all future requests to access the software at the specified reference location will access either private copy 506b or 506c of the new version of the software. Since all members have now been upgraded, it is now possible to upgrade the old version 506a of the software to the new version. Turning to FIG. 5G, this figure shows the system after upgrading the shared copy the software 506a.

Figure 5H:
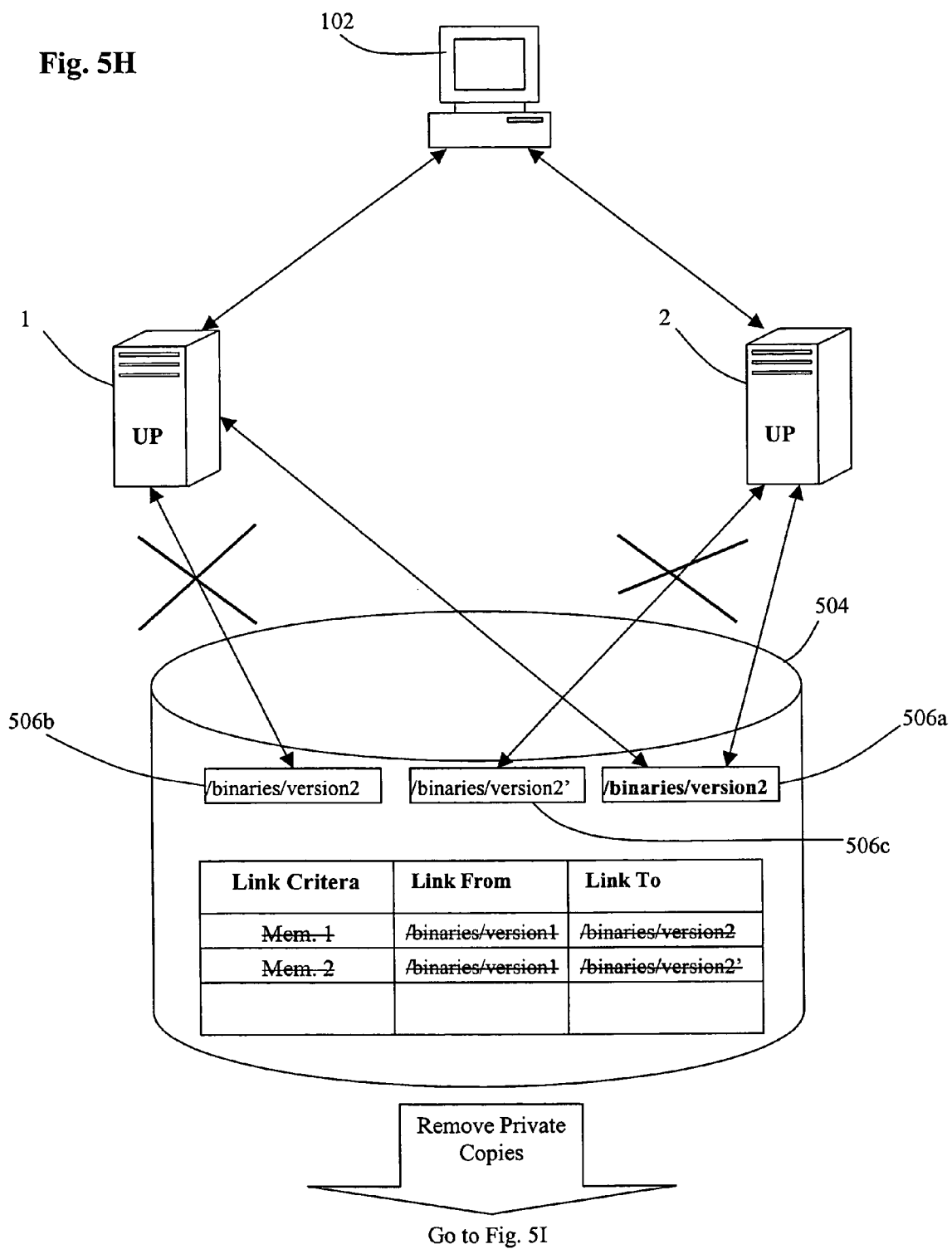

Referring to FIG. 5H, the links to the private copies 506b and 506c of the new version can be removed, allowing the members 1 and 2 to point to the shared copy 506a of the upgraded version of the software. At this point, the system is configured such that all future requests to access the software at the specified reference location will access the shared copy 506a of the new version of the software.

Figure 5I:
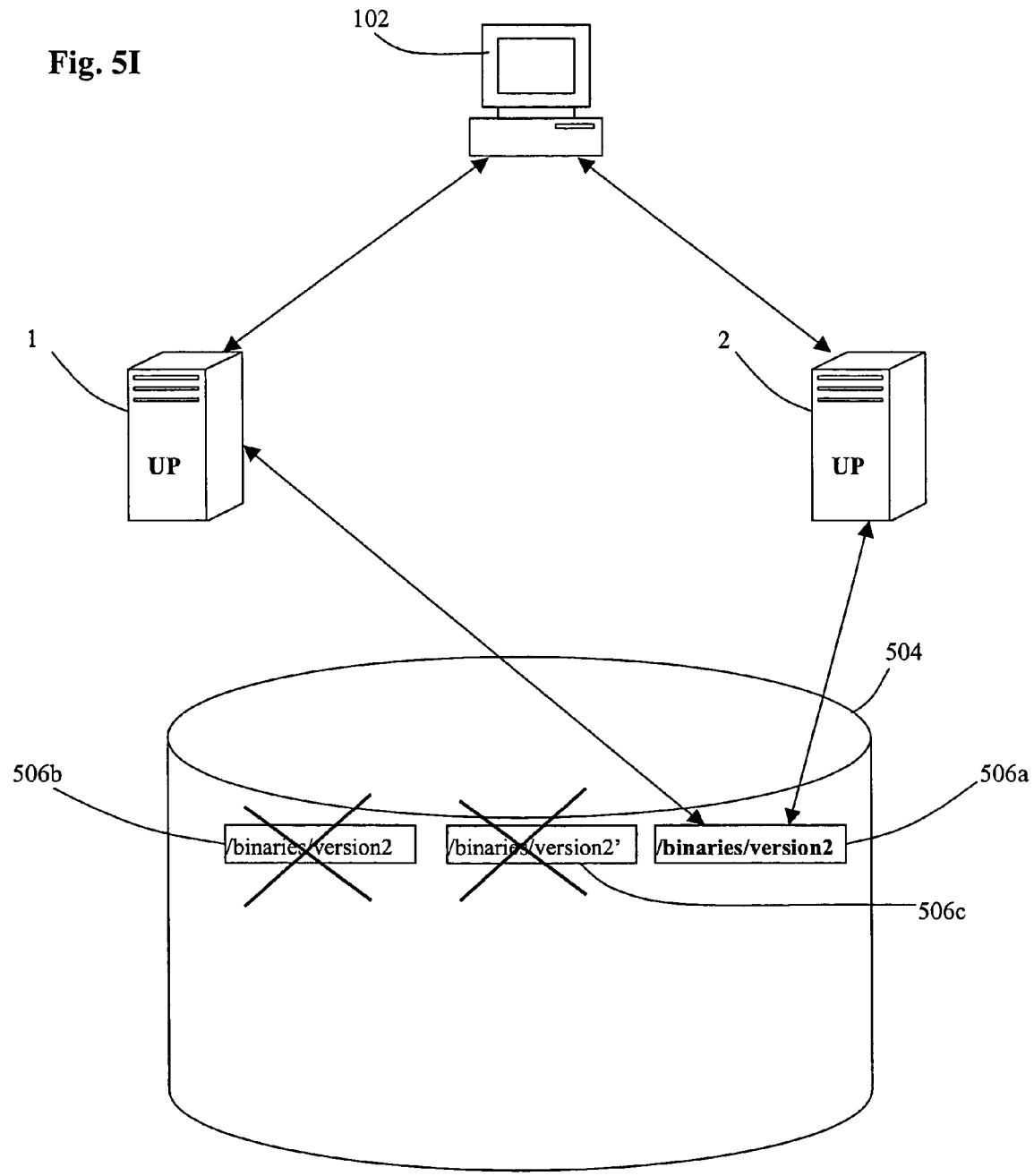

Since the members 1 and 2 no longer link to the private copies 506b and 506c of the software, these private copies can be removed. FIG. 5I shows the deletion of the private copies 506b and 506c. The rolling upgrade process now ends.

Multiple versions of the software application can co-exist in the distributed system through the rolling upgrade process. Since member private symbolic links are used, each member may point to different versions of the software. Therefore, if it is desired to leave individual members at different versions of the software, this can be accomplished without interfering with the ability of other members to point to other versions of the software.

The present approach can be applied not only to distributed systems in which the members are on different network nodes, but can also be applied to perform rolling upgrades in which multiple entities occupy the same network node. This type of situation may occur, for example, for a multi-instance application that resided on a single node. The present approach can be used to ensure a high level of availability for the multiple instances on the single network node during a rolling upgrade be creating private symbolic links for the individual instances, as described with respect to FIG. 3A or 3B.

Therefore, what has been described is an improved process for performing a rolling upgrade to software. It is noted, however, the principles described herein are applicable to a wide variety of different applications in which file branching is desired. For example, the present application may be applicable to situations in which the shared files are data files, rather than shared application executables. This occurs, for example, with stored web pages at a central server. Consider if a first member operate a first type of web browser and a second member operates a second type of web browser, in which it is desirable to maintain a different version of the same web page for each type of browser. In this situation, a private symbolic link could be used to automatically allow each member to correctly reference the specific web page corresponding to its browser type, even though both members may actually attempt to access the same file/pathname or web page name.

When the software to access the shared data files are upgraded, the above process can be used to provide seamless changes to the specific data files accessed by the upgraded applications. Again using the web browser application as an example, consider a browser application that is changed from an earlier version to a later version on a network member. Assume that it is desirable to maintain a different version of the same web page for each version of browser. When the member upgrades to the new version of the browser, a private symbolic link can be defined to allow the upgraded to member to automatically access the correct web page after the upgrade.

System Architecture Overview

Figure 6:
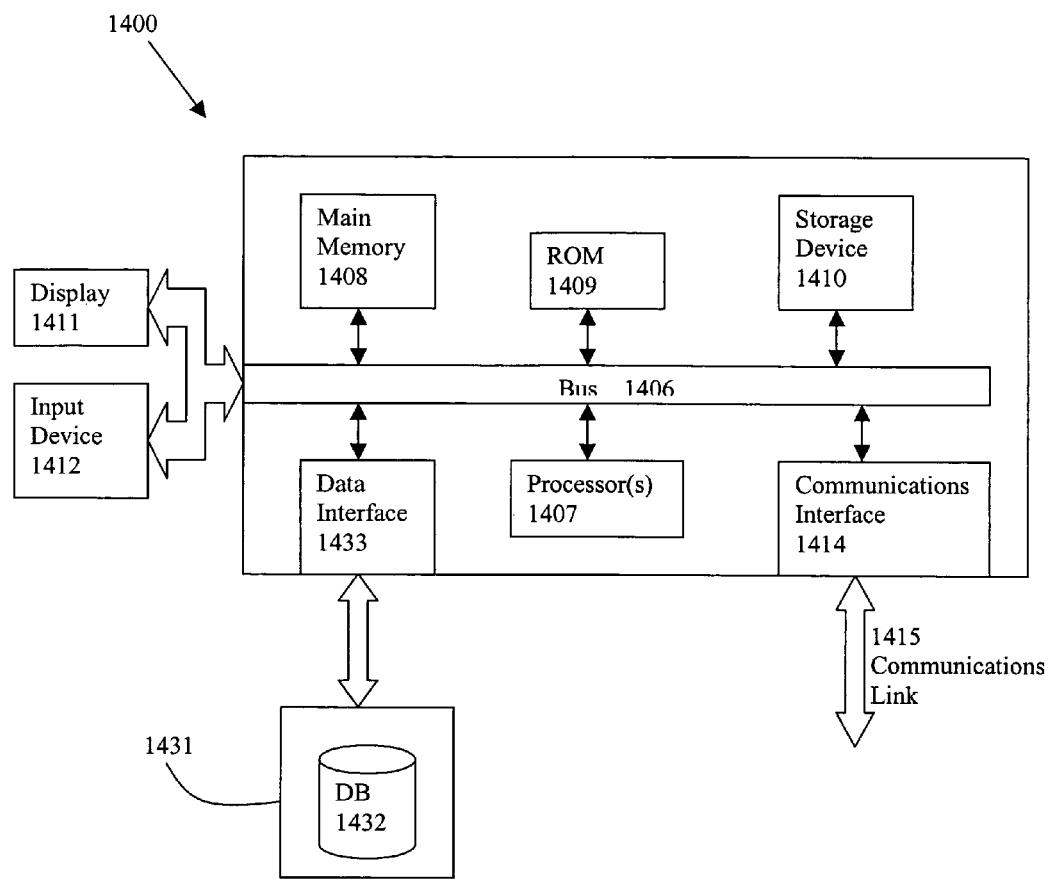
FIG. 6 is a diagram of a computer system with which the present invention can be implemented.

The execution of the sequences of instructions required to practice the invention may be performed in embodiments of the invention by a computer system 1400 as shown in FIG. 6. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for performing a rolling upgrade in a computing system in which multiple members execute a computer application based at least in part upon a first version of a shared file, comprising:

using a processor for:

creating a second version of the shared file;

bringing down a first member, wherein a second member is not brought down while the first member is down;

generating a first private symbolic link for the first member to reference the second version of the shared file, the first private symbolic link comprising link criteria that designates that the first member of a group is authorized to use the first private symbolic link such that the first private symbolic link does not provide a universally visible symbolic link so that the first private symbolic link is not visible to the second member of the group, wherein the first member uses the first private symbolic link and second member uses a second private symbolic link to access different versions of the shared file based such that the first and second private symbolic links are used to perform the rolling upgrade in a staggered manner in the computing system, wherein the second private symbolic link does not provide the universally visible symbolic link so that the second private symbolic link is not visible to the first member of the group;

bringing up the first member so that the first member references the second version of the shared file; and storing the private symbolic link in a volatile or non-volatile computer usable medium or displaying the private symbolic link on a display device.

2. The method of claim 1 further comprising:

bringing down the second member, wherein the first member is not brought down while the second member is down;

creating second private symbolic link for the second member to reference the second version of the shared file; and bringing up the second member.

3. The method of claim 2 in which the first private symbolic link and the second symbolic links are the same, and wherein both the first and second members of the group associated with the first private symbolic link.

4. The method of claim 2 further comprising removing the first version of the shared file.

5. The method of claim 2 in which the first private symbolic link for the first member references a first private copy of the second version of the shared file and the second private symbolic link for the second member references a second private copy of the second version of the shared file.

6. The method of claim 2 in which the first private symbolic link for the first member and the second symbolic link for the second member references the same copy of the second version of the shared file.

7. The method of claim 1 further comprising:
bringing down the second member, wherein the first member is not brought down while the second member is down;
creating a second private symbolic link for the second member to reference a third version of the shared file; and
bringing up the second member so that the second member references the third version of the shared file, wherein both the first member and the second member simultaneously operate different versions in the computing system.

8. The method of claim 1 in which one or more copies exist for each version of the computer application.

9. The method of claim 1 in which the first private symbolic link comprises a properly that identifies a link criteria.

10. The method of claim 9 in which the link criteria comprises a member identifier.

11. The method of claim 1 further comprising:
creating a direct object reference for the first member to the second version of the shared file.

12. The method of claim 1 in which the direct object reference is automatically created by removing the first private symbolic link.

13. The method of claim 1 further comprising:
creating a third version of the shared file;
bringing down the second member, wherein the first member is not brought down while the second member is down;
creating a second private symbolic link for the second member to reference the third version of the shared file; and
bringing up the second member.

14. The method of claim 1 in which the act of creating the second version of the shared file comprises:
copying the shared file; and
patching the shared file to create the second version.

15. The method of claim 1 in which the first private symbolic link is private to a member.

16. The method of claim 1 in which the act of bringing down the first member comprises:
shutting down a computer application at a node associated with the first member.

17. The method of claim 1 in which the first member still executes the first version of the computer application concurrently with the second member executing the new version of the computer application.

18. A computer implemented method for redirecting a reference from an entity to one or more shared files, comprising:
creating a first version of a shared file;
creating a second version of a shared file;
creating a first private symbolic link to reference the first version of the shared file, the first private symbolic link comprising link criteria that designates that members in a first group are authorized to use the first private symbolic link such that the first private symbolic link does not provide a universally visible symbolic link so that the first private symbolic link is not visible to members of a second group, wherein the members of the second group can not access the first version of the shared file such that by utilizing the first private symbolic link is used to perform the rolling upgrade in a first staggered manner;
creating a second private symbolic link to reference the second version of the shared file, the second private symbolic link only applying to the members of the second group associated with the second private symbolic link such that the second private symbolic link does not provide the universally visible symbolic link so that the second private symbolic link is not visible to the members of the first group, wherein the members of the first group can not access the second Version of the shared file such that by utilizing the second private symbolic link is used to perform the rolling upgrade in a second stagger manner; and
storing the first private symbolic link and/or the second private symbolic link in a volatile or non-volatile computer usable medium or displaying the first private symbolic link and/or the second private symbolic link on a display device.

19. The method of claim 18 in which the first and second versions of the shared file are web pages.

20. The method of claim 19 in which members of a first group are entities operating a first browser application and members of the second group are entities operating a second browser application.

21. The method of claim 18 in which the first symbolic link has a link criteria that defines the membership of the members of the first group associated with the first symbolic link.

22. The method of claim 21 in which the link criteria identifies a member to create a member private symbolic link.

23. The method of claim 21 in which the link criteria identifies an application version number.

24. The method of claim 21 in which the first group comprises multiple entities as members.

25. The method of claim 21 in which the first symbolic link provides a reference for a specific pathname.

26. The method of claim 21 in which the first symbolic link provides a reference for a directory.

27. The method of claim 18 in which the first private symbolic link references a first private copy of the first version of the shared file and the second private symbolic link references a second private copy of the second version of the shared file.

28. The method of claim 18 wherein both the members of the first group and members of the second group simultaneously operate different versions of the one or more shared files.

29. The method of claim 18 in which one or more copies exist for each version of the one or more shared files.

30. The method of claim 18 further comprising:
creating a direct object reference for the members of the first group to the first version of the shared file.

31. The method of claim 30 in which the direct object reference is automatically created by removing the first private symbolic link.

32. A computer implemented system for performing a rolling upgrade in a computing system in which multiple members execute a computer application based at least in part upon a first version of a shared file, comprising:
a processor for:
creating a second version of the shared file;
bringing down a first member, wherein a second member is not brought down while the first member is down;

generating a private symbolic link for the first member to reference the second version of the shared file, the private symbolic link comprising link criteria that designates that the first member of a group is authorized to use the private symbolic link such that the private symbolic link does not provide a universally visible symbolic link so that the private symbolic link is not visible to the second member of the group, wherein the first member uses the private symbolic link and second member uses a second private symbolic link to access different versions of the shared file such that the private symbolic link is used to perform during the rolling upgrade in stagger manner in the computing system, wherein the second private symbolic link dose not provide the universally visible symbolic so that second private symbolic is not visible to the first member of the group;

bringing up the first member so that the first member references the second version of the shared file: and a volatile or non-volatile computer usable medium for storing the first private symbolic link or a display device for displaying the first private symbolic link.

33. A computer program product comprising a volatile and non-volatile computer usable medium having executable code to execute a process by using a processor for performing a rolling upgrade in a computing system in which multiple members execute a computer application based at least in part upon a first version of a shared file, the process comprising:

creating a second version of the shared file;

bringing down a first member, wherein a second member is not brought down while the first member is down;

generating a first private symbolic link for the first member to reference the second version of the shared file, the first private symbolic link comprising link criteria that designates that the first member of a group is authorized to use the first private symbolic link such that the first private symbolic link does not provide a universally visible symbolic link so that the first private symbolic link is not visible to the second member of the group, wherein the first member uses the first private symbolic link and second member uses a second private symbolic link to access different versions of the shared file such that the private symbolic link is used to perform the rolling upgrade in a staggered manner in the computing system, wherein the second private symbolic link does not provide the universally visible symbolic link so that the second private symbolic link is not visible to the first member of the group;

bringing up the first member so that the first member references the second version of the shared file; and storing the first private symbolic link or displaying the first private symbolic link on a display device.

34. A computer implemented system for redirecting a reference from an entity to one or more shared files, comprising: using a processor for:

creating a first version of a shared file;

creating a second version of a shared file;

creating a first private symbolic link to reference the first version of the shared file, the first private symbolic link comprising link criteria that designates that members in a first group are authorized to use the first private symbolic link such that the first private symbolic link does not provide a universally visible symbolic link so that the first private symbolic link is not visible to members of a second group, wherein the members of the second group can not access the first version of the shared file such that by utilizing the first private symbolic link is used to perform the rolling upgrade in a first staggered manner; and creating a second private symbolic link to reference the second version of the shared file, the second private symbolic link only applying to the members of the second group associated with the second private symbolic link such that the second private symbolic link does not provide the universally visible symbolic link so that the second private symbolic link is not visible to the members of the first group, wherein the members of the first group can not access the second version of the shared file such that by utilizing the second private symbolic link is used to perform the rolling upgrade in a second staggered manner; and storing the first private symbolic link and/or the second private symbolic link or displaying the first private symbolic link and/or the second private symbolic link on a display device.

35. A computer program product comprising a volatile or non-volatile computer usable medium having executable code to execute a process by using a processor for redirecting a reference from an entity to one or more shared files, the process comprising:

creating a first version of a shared file;

creating a second version of a shared file;

creating a first private symbolic link to reference the first version of the shared file, the first private symbolic link comprising link criteria that designates that members in a first group are authorized to use the first private symbolic link such that the first private symbolic link does not provide a universally visible symbolic link so that the first private symbolic link is not visible to members of a second group, wherein the members of the second group can not access the first version of the shared file such that by utilizing the first private symbolic link is used to perform rolling upgrade in staggered manner;

creating a second private symbolic link to reference the second version of the shared file, the second private symbolic link only applying to the members of the second group associated with the second private symbolic link such that the second private symbolic link does not provide the universally visible symbolic link so that the second private symbolic link is not visible to the members of the first group, wherein the members of the first group can not access the second version of the shared file such that by utilizing the second private symbolic link is used to perform the rolling upgrade in a second staggered manner; and storing the first private symbolic link and/or the second private symbolic link or displaying the first private symbolic link and/or the second private symbolic link on a display device.

36. The system of claim 32 in which the first private symbolic link is private to a member.

37. The system of claim 32 in which the first member still executes the first version of the computer application concurrently with the second member executing the new version of the computer application.

38. The product of claim 33 in which the first private symbolic link is private to a member.

39. The product of claim 33 in which the first member still executes the first version of the computer application concurrently with the second member executing the new version of the computer application.

40. The system of claim 34 in which the first and second versions of the shared file are web pages.

41. The system of claim 34 in which the first private symbolic link references a first private copy of the first version of the shared file and the second private symbolic link references a second private copy of the second version of the shared file.

42. The product of claim 35 in which the first and second versions of the shared file are web pages.

43. The product of claim 35 in which the first private symbolic link references a first private copy of the first version of the shared file and the second private symbolic link references a second private copy of the second version of the shared file.

* * * * *

UNITED STATES PATENT AND TRADEMARK OFFICE
CERTIFICATE OF CORRECTION

Page 1 of 3

PATENT NO. : 7,757,226 B2
APPLICATION NO. : 10/803623
DATED : July 13, 2010
INVENTOR(S) : Alok Kumar Srivastava et al.

It is certified that error appears in the above-identified patent and that said Letters Patent is hereby corrected as shown below:

On page 2, in column 2, under "Other Publications", line 37, delete "Priciples" and insert -- Principles --, therefor.

On page 2, in column 2, under "Other Publications", line 40, delete "Parellel" and insert -- Parallel --, therefor.

On page 2, in column 2, under "Other Publications", line 41, delete "Rollbackk-" and insert -- Rollback --, therefor.

On page 2, in column 2, under "Other Publications", line 46, delete "Intermational" and insert -- International --, therefor.

On page 2, in column 2, under "Other Publications", line 58, delete "Seattly," and insert -- Seattle, --, therefor.

On sheet 2 of 22, in Figure 2A, Box no. 220, line 1, delete "Link Critera" and insert -- Link Criteria --, therefor.

On sheet 7 of 22, in Figure 4B, Box no. 408, line 1, delete "Link Critera" and insert -- Link Criteria --, therefor.

On sheet 8 of 22, in Figure 4C, Box no. 408, line 1, delete "Link Critera" and insert -- Link Criteria --, therefor.

On sheet 9 of 22, in Figure 4D, Box no. 408, line 1, delete "Link Critera" and insert -- Link Criteria --, therefor.

On sheet 10 of 22, in Figure 4E, Box no. 408, line 1, delete "Link Critera" and insert -- Link Criteria --, therefor.

Signed and Sealed this
Third Day of May, 2011

David J. Kappos
*Director of the United States Patent and Trademark Office*

CERTIFICATE OF CORRECTION (continued)
U.S. Pat. No. 7,757,226 B2

On sheet 11 of 22, in Figure 4F, Box no. 408, line 1, delete "Link Critera" and insert -- Link Criteria --, therefor.

On sheet 14 of 22, in Figure 5B, Box no. 508, line 1, delete "Link Critera" and insert -- Link Criteria --, therefor.

On sheet 15 of 22, in Figure 5C, Box no. 508, line 1, delete "Link Critera" and insert -- Link Criteria --, therefor.

On sheet 16 of 22, in Figure 5D, Box no. 508, line 1, delete "Link Critera" and insert -- Link Criteria --, therefor.

On sheet 17 of 22, in Figure 5E, Box no. 508, line 1, delete "Link Critera" and insert -- Link Criteria --, therefor.

On sheet 18 of 22, in Figure 5F, Box no. 508, line 1, delete "Link Critera" and insert -- Link Criteria --, therefor.

On sheet 19 of 22, in Figure 5G, Above Mem. 1, line 1, delete "Link Critera" and insert -- Link Criteria --, therefor.

On sheet 19 of 22, in Figure 5G, line 1-4, delete " 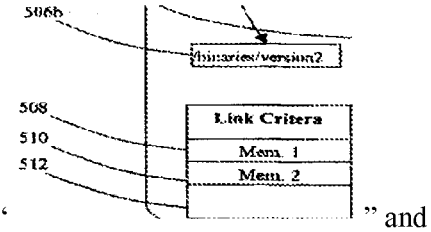 " and insert -- 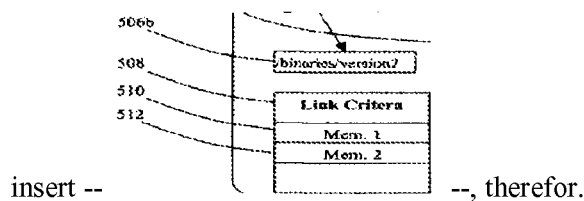 --, therefor.

On sheet 20 of 22, in Figure 5H, Below Box No. 506b, line 1, delete "Link Critera" and insert -- Link Criteria --, therefor.

In column 1, line 61-62, delete "filesystem" and insert -- file system --, therefor.

In column 1, line 65, delete "filesystem" and insert -- file system --, therefor.

In column 2, line 60, delete "filesystems." and insert -- file systems. --, therefor.

In column 4, line 44, delete ""binaries/" and insert -- "/binaries/ --, therefor.

CERTIFICATE OF CORRECTION (continued)
U.S. Pat. No. 7,757,226 B2

In column 4, line 57, delete ""binaries/" and insert -- "/binaries/ --, therefor.

In column 5, line 34, delete ""binaries/" and insert -- "/binaries/ --, therefor.

In column 7, line 46, delete "1;" and insert -- 1. --, therefor.

In column 13, line 25, in claim 9, delete "properly" and insert -- property --, therefor.

In column 14, line 15, in claim 18, delete "Version" and insert -- version --, therefor.